United States Patent [19]

Webb

[11] Patent Number: 4,760,525

[45] Date of Patent: Jul. 26, 1988

[54] COMPLEX ARITHMETIC VECTOR PROCESSOR FOR PERFORMING CONTROL FUNCTION, SCALAR OPERATION, AND SET-UP OF VECTOR SIGNAL PROCESSING INSTRUCTION

[75] Inventor: Richard F. Webb, Baltimore, Md.

[73] Assignee: The United States of America as represented by the Secretary of the Air Force, Washington, D.C.

[21] Appl. No.: 872,737

[22] Filed: Jun. 10, 1986

[51] Int. Cl.⁴ .................. G06F 15/347; G06F 15/31; G06F 15/332

[52] U.S. Cl. ................................................. 364/200

[58] Field of Search ... 364/200 MS File, 900 MS File, 364/736

[56] References Cited

U.S. PATENT DOCUMENTS

| | | | |
|---|---|---|---|
| 3,541,516 | 11/1970 | Senzig | 340/172.5 |
| 3,794,984 | 2/1974 | Deerfield et al. | 340/172.5 |
| 3,900,723 | 8/1975 | Bethany et al. | 235/156 |
| 4,051,551 | 9/1977 | Lawrie et al. | 364/200 |
| 4,107,773 | 8/1978 | Gilbreath et al. | 364/200 |
| 4,128,876 | 12/1978 | Ames et al. | 364/200 |
| 4,162,534 | 7/1979 | Barnes | 364/900 |
| 4,172,287 | 10/1979 | Kawabe et al. | 364/736 |
| 4,302,818 | 11/1981 | Niemann | 364/200 |
| 4,674,032 | 6/1987 | Michaelson | 364/200 |
| 4,685,076 | 8/1987 | Yoshida | 364/736 |

Primary Examiner—Raulfe B. Zache
Assistant Examiner—Ayni Mohamed
Attorney, Agent, or Firm—Bernard E. Franz; Donald J. Singer

[57] ABSTRACT

The processor is optimized for high-speed processing of large vectors, to fully utilize VHSIC technology, and to implement a signal processor having the highest possible throughput per volume while maintaining flexibility. It includes a 25 MHz embedded 1750A computer for performing control function scalar operations and set-up of vector signal processing instructions to be performed by a vector processing unit. The 40 MHz vector processing unit (VPU) performs high speed processing of real and complex vectors. The VPU's control portion provides an interface and status to the embedded 1750A computer. It also provides the control necessary for vector processing to occur concurrently with 1750A execution and concurrent with I/O of vector data.

6 Claims, 17 Drawing Sheets

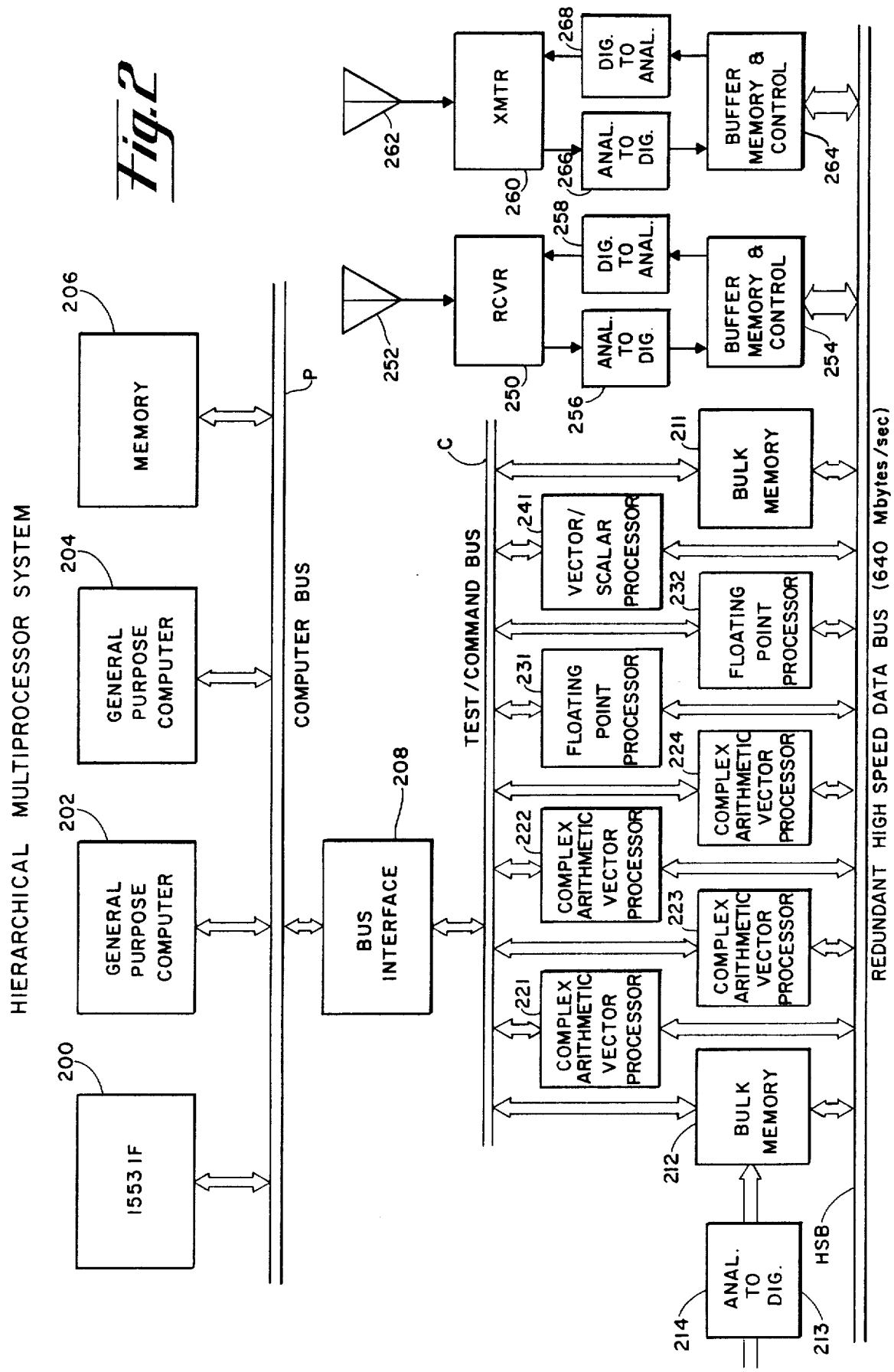

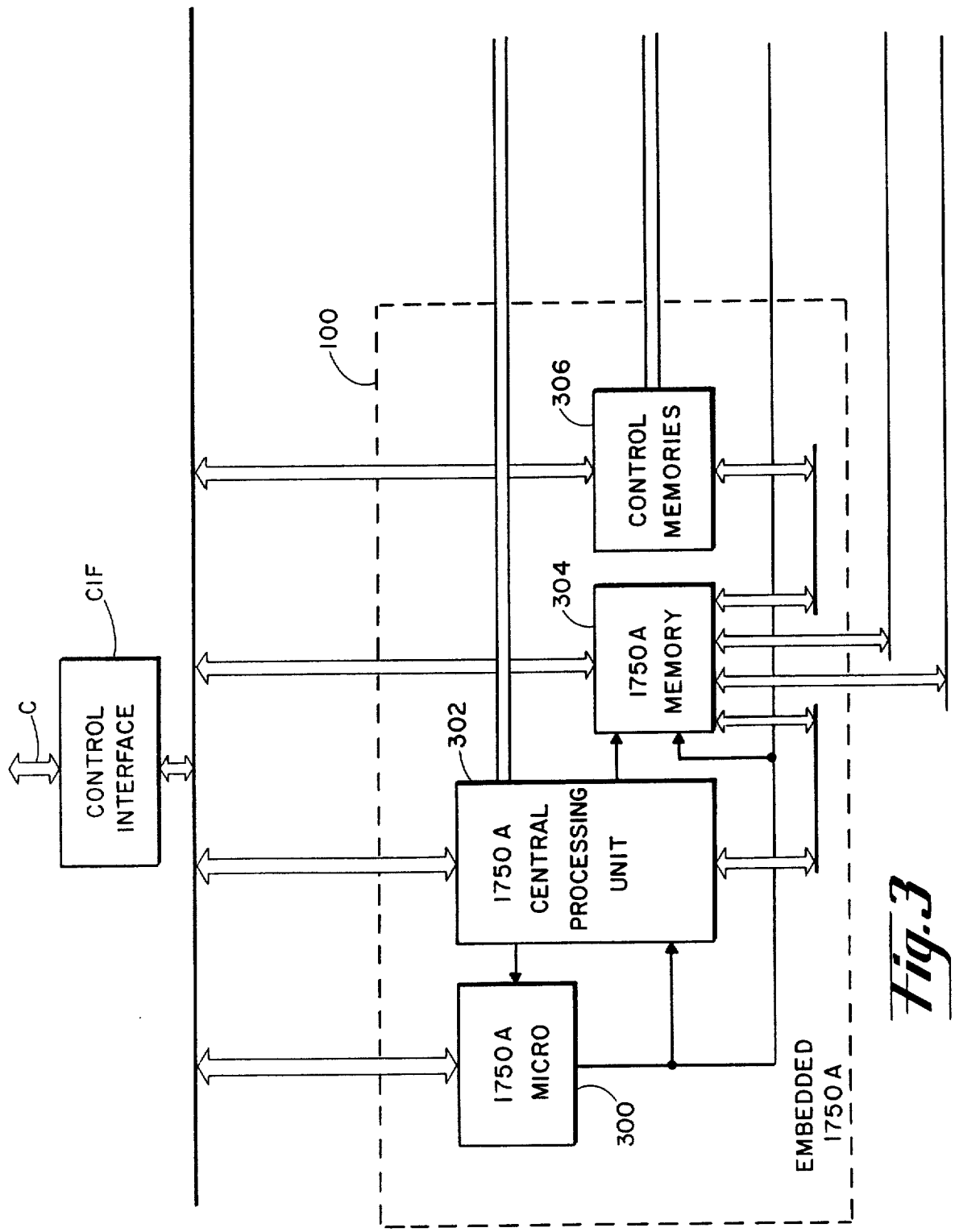

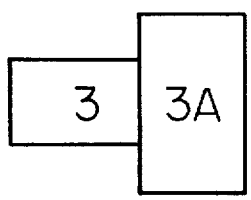
*Fig.3b*
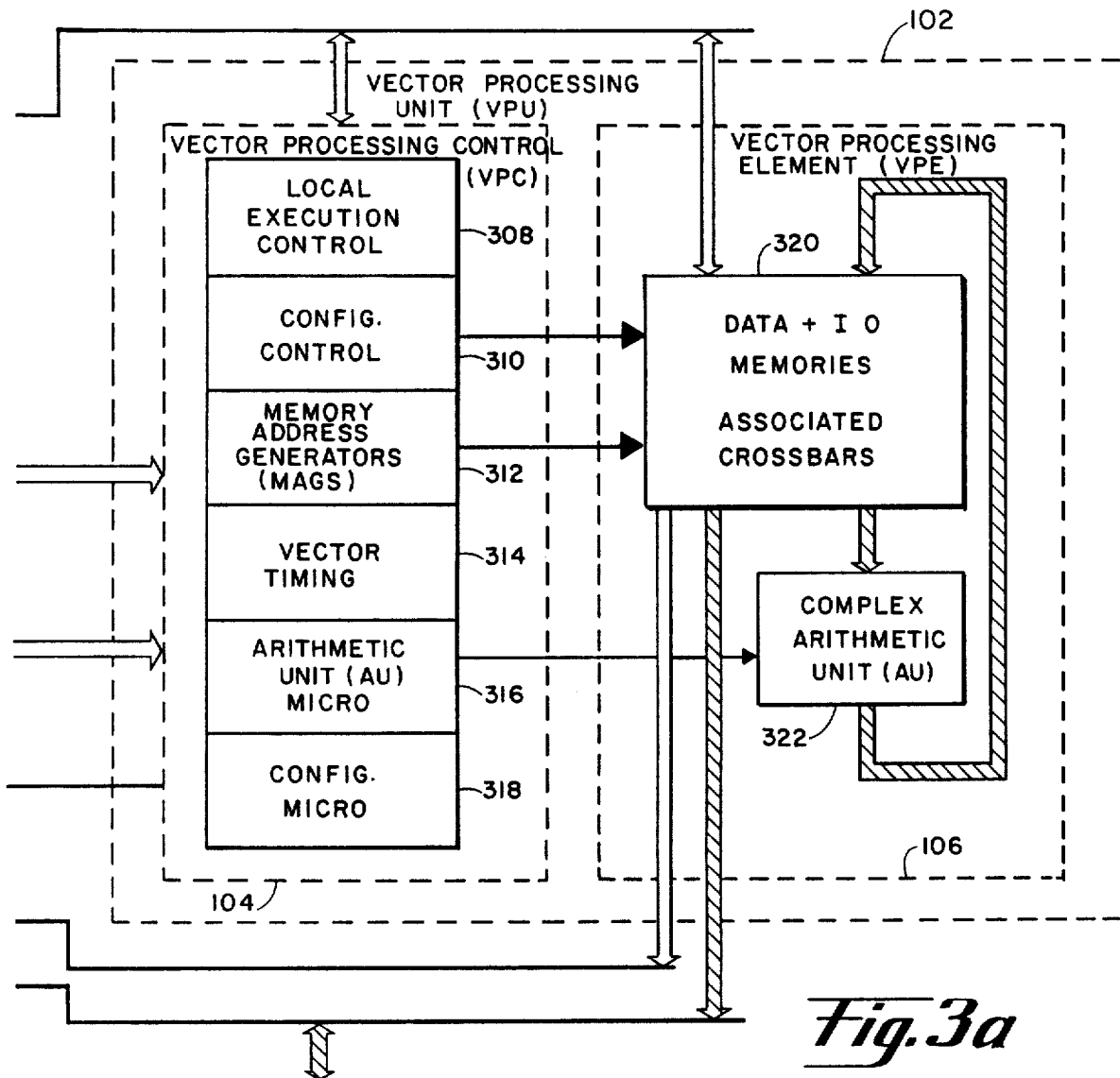
*Fig.3a*
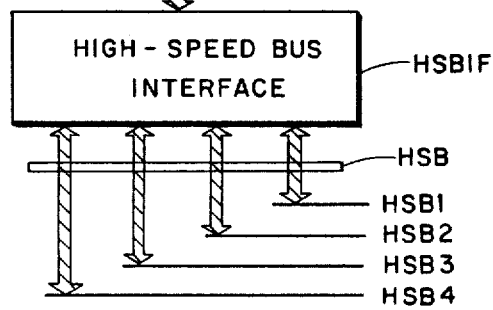

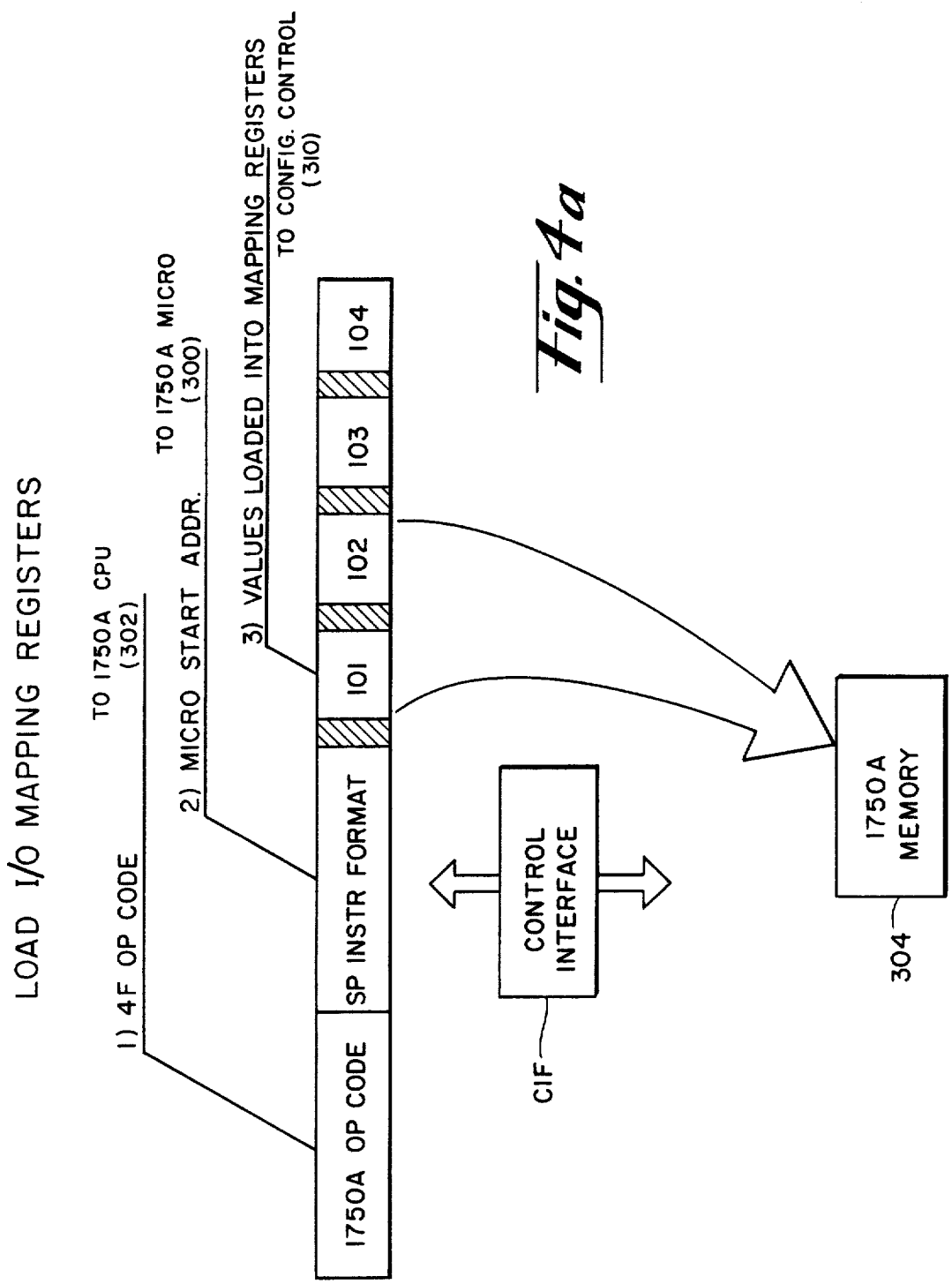

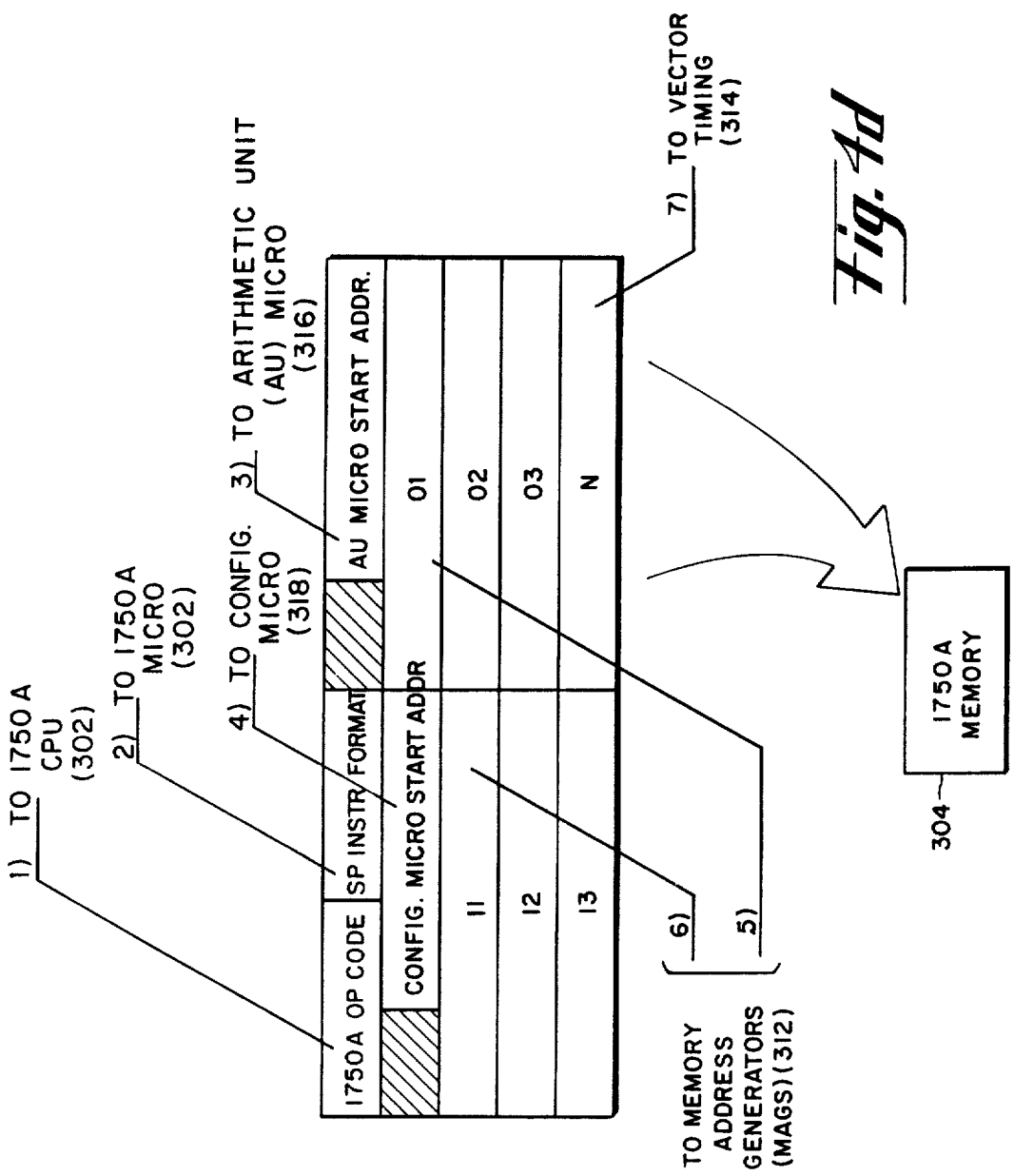

COMPLEX ARITHMETIC VECTOR PROCESSOR FOR PERFORMING CONTROL FUNCTION, SCALAR OPERATION, AND SET-UP OF VECTOR SIGNAL PROCESSING INSTRUCTION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a complex arithmetic vector processor (CAVP), particularly for use in a hierarchical multiprocessor system (HMS) using very high speed integrated circuit (VHSIC) chips in microprogrammed modules.

U.S. patents showing the state of the art include U.S. Pat. No. 3,900,723 to Bethany et al which discloses an apparatus for controlling the arithmetic units of a computer pipeline to accomplish arithmetic operations on a plurality of operand vectors to derive resultants. U.S. Pat. No. 4,172,287 to Kawabe et al discloses a data processing apparatus for processing vector instructions at very high speeds. U.S. PAt. No. 3,541,516 to Senzig discloses a vector arithmetic multiprocessor computer system which operates on vector arithmetic problems in which identical operations are to be performed substantially simultaneously upon a plurality of different units of data. U.S. Pat. No. 4,128,876 to Ames et al discloses an interface comprising asynchronous I/O interface hardware in combination with additional synchronizing connections between a microcoded central processing unit and a microcoded secondary processor. U.S. Pat. No. 3,794,984 to Deerfield et al discloses a digital computer adapted to perform vector and matrix operations.

SUMMARY OF THE INVENTION

An objective of the invention is to provide a complex arithmetic vector processor which is optimized for high speed processing of large vectors, to fully utilize VHSIC technology, and to implement a signal processor having the highest possible throughput per volume while maintaining flexibility.

The complex arithmetic vector processor (CAVP) according to the invention includes a 25 MHz embedded 1750A computer for performing control functions, scalar operations and set-up for vector signal processing instructions to be performed by a vector processing unit. The 40 MHz vector processing unit (VPU) performs high speed processing of real and complex vectors. The VPU's control portion provides an interface and status to the embedded 1750A computer. It also provides the control necessary for vector processing to occur concurrently with 1750A execution and concurrent with I/O of vector data.

BRIEF DESCRIPTION OF THE DRAWING

FIG. 2 is a block diagram of a hierarchial multiprocessor system;

FIGS. 3 and 3A, when arranged as shown in FIG. 3B, comprise a more detailed block diagram of the processor of FIG. 1;

FIGS. 4A-4D are diagrams showing an overview of the operation, with FIG. 4A showing an operation for loading input/output mapping registers, FIG. 4B showing an operation for loading physical and logical mapping registers, FIG. 4C showing a vector data input operation, and FIG. 4D showing an operation for signal processing instruction setup;

DETAILED DESCRIPTION

Figure 1:
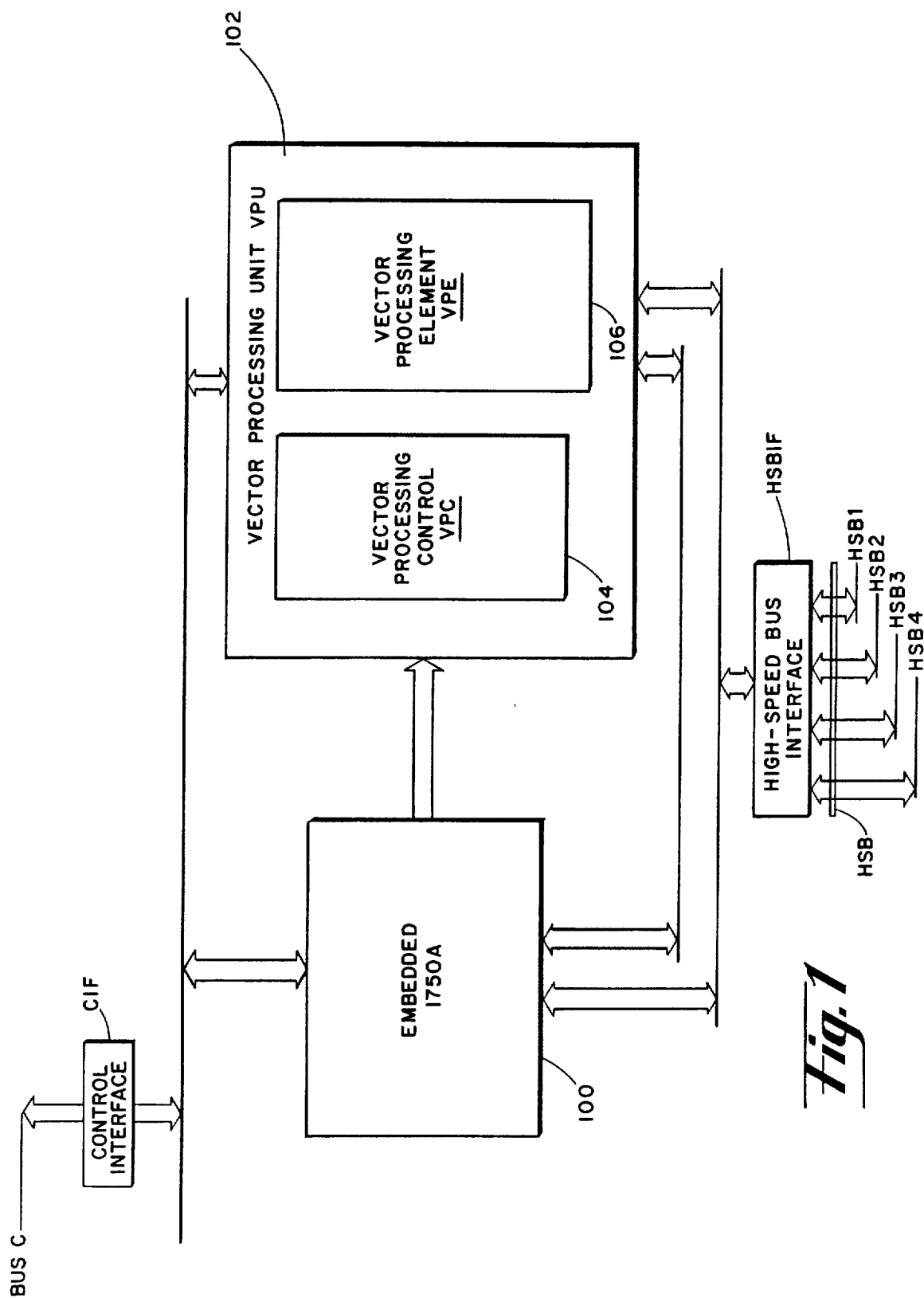
FIG. 1 is a simplified block diagram of of a complex arithmetic vector processor (CAVP) according to the invention.

The Complex Arithmetic Vector Processor (CAVP) shown by a simplified block diagram in FIG. 1 is one of a number of standard modules for a system using VHSIC technology, with a small number of different chips. It comprises an embedded 1750A computer 100, and a vector processing unit (VPU) 102, the latter having a vector processing control section (VPC) 104 and a vector processing element (VPE) 106. It interfaces with a C-bus via an interace CIF, and with a redundant high-speed data bus HSB via an interface HSBIF.

In the VHSIC common module family, the CAVP provides a very high speed capability for meeting advanced signal processing requirements. It is capable of processing vectors of complex data at 40 MHz rates with a high degree of accuracy. A transform pair for the complex butterfly required for FFT computation is generated each 25 nsec; the total time required to compute a 1024 point FFT is 131 μsec.

The CAVP can be programmed with an extensive set of instructions to implement a wide range of signal processing algorithms. Among the algorithms which can be processed at the 40 MHz processing rate are those used for determining the FFT, transversal and recursive filters, correlation, convolution and adaptive thresholding. The powerful computing capability of the CAVP can be applied effectively to electronic warfare, radar signal processing, image processing, communication systems signal analyses and acoustic-signal processing.

Since it contains an embedded 1750A computer 100, the CAVP can be used in the autonomous mode without an external computer. It can also be used in configurations tailored to particular applications or in a hierarchical multiprocessor system (HMS).

Key features of the CAVP system include:

Programmability - incorporates a powerful instruction set including three types of FFT instructions, four other filter instructions, many signal processing instructions. Will support Ada higher order language.

Versatility - microprogrammed arithmetic and control configuration permits customizing instructions for the user.

Efficient Program Control
1. Instruction fetch overlap
2. Execution overlap
3. Program control on external events
4. 16 levels of repeat FFT Processing Oriented
1. 131 μsec 1024 Point FFT
2. Use of special logic for address generation and FFT control.

Powerful Arithmetic Unit
1. Four concurrent 40 MHz processors, each with a multiplier and two ALUs
2. 25 ns 16×16 pipeline mulitply rate with provision for rounding
3. Overflow detection and saturation limiting
4. Input and output scaling Accuracy - complex 16-bits (31-bit hardware double precision)

Data Memory - 10 memories, each 8K words ×32 bits

Double-buffered Input/Output - Input/output operating transparently to program.

HIERARCHIAL MULTIPROCESSOR SYSTEM

The CAVP is one of a number of standard modules for a system using VHSIC technology, with a small number of different chips. The modules are independently programmable elements of a hierarchical multiprocessor system (HMS). The system consists of clusters of up to sixteen modules interconnected by a very high bandwidth command and data transfer bus system (over 160,000,000 wps). For massive signal processing tasks, multiple clusters may be interconnected. Each of the processing modules contains an embedded programmable general purpose computer which executes the MIL-STD 1750A ISA, which is hereby incorporated by reference.

A Hierarchical Multiprocessor System might be configured as shown in FIG. 2. At the highest level is a General Purpose Computer 202 and a memory element 206. The GP Computer 202 performs the control function for the Multiprocessor System. It is the executive operating system; it performs functions which are distinct from the applications functions performed by lower levels. For example, the computer 202 may receive internal status information or system control information from external sources. On the basis of this information, a decision may be made on initiating a mode and then allocating second level processor and bulk memory resources and the associated bus control. Necessary second level applications programs and data may then be down loaded from the memory storage element 206. A set of operating system utilities and a run time package facilitates the operation.

At the intermediate level is a combination of modules totaling up to sixteen, which includes processors, bulk memories, interfaces and one or possibly more data bus controllers. In systems such as radar or ECM (electronic countermeasures), the interfaces may be a receiver 250, and a transmitter 260.

The receiver 250 and transmitter 260 have buffer memory and digital controllers 254 and 264 respectively which are each coupled to at least one data bus of the system. Analog-to-digital and ditigal-to-analog converters 256 and 258 for the receiver and 266 and 268 for the transmitter couple the analog and digital portions of these subsystems. The receiver and transmitter each have an antenna array shown as symbols 252 and 262 which may be configured for angle-or-arrival and other parameters.

Also at the intermediate level, FIG. 2 shows other processor modules, which may include Complex Arithmetic Vector Processors (CAVP) 221-224 which perform high speed signal processing functions on complex data, Vector/Scalar Processors 241 (VSP) which perform vector operations on real data, and Floating Point Processors (FPP) 231-232 which perform operations on complex 32-bit floating point data for greater precision and dynamic range than the VSP module.

Bulk Memory modules 211-212 are 1M-byte intermediate storage medium for data buffering. Raw data, as well as partially processed data is stored here. Some of these modules such as 212 may be coupled to receive input from an external source via an analog transmission line 213 and an A/D converter 214.

The bus system includes a computer bus P which interconnects the general purpose processors 200, 202, 204 and the memory element 206. A test, command and control bus C is coupled to the bus P via a bus interface unit 208. Bus C is coupled to all of the modules at the intermediate level. There are a plurality of high-speed data buses, represented in FIG. 2 as HSB. Each intermediate module is coupled to one or more of the data buses.

Thus, there are two kinds of interconnecting buses - each with different transfer rates and latency characteristics. The control bus operates at a 10-MHZ word transfer rate with relatively low latency (short packet transfers). The control bus is the standard control communications interface between all major modules. The control bus interfaces with an identical gate array on each intermediate level processing module. It is over the bus C that tasks are assigned by the system control computer. The high speed bus network has a plurality of 40-MHZ buses. Some or all of these buses may be segmented in a ring structure with independent interprocessor segments possible concurrently on the same bus. Via the bus controller module (not shown) the interconnection scheme can be dynamically programmed. The bus is optimized for very high speed transfers of relatively large blocks of data and consequently has high latency. Some of the data buses might be configured to allow very fast transfers of small data sets, or alternatively be dedicated to a process and use high frequency polling to achieve fast reaction times.

ADVANCED POWER MANAGEMENT SYSTEM

One example of many possible systems which could utilize the CAVP is an Advanced Power Management System defined in a specification from the Air Force Wright Aeronautical Laboratories (AFWAL) relating to an electronic countermeasures system for gathering and evaluating data from radar pulses in the environment, and generating pulse waveforms for jamming, etc.

The object of the Hieracrchial Multiprocessor System is to provide a fully programmable system as opposed to a rigid system with varying degrees of programmability at the module level. Analysis shows that the great majority of digital processing operations could be classified as one of the following:

1. General purpose processing - high control bandwith, low to moderate data throughput. Complex software.
2. Vector processing - repetitive operations needed at high speed. Low to moderate control bandwidth. Fast real time response not critical. Occasional general purpose scalar operations embedded between vector and array operations. Moderately complex software.
3. High speed preprocessing - fast response to real time events. Small programs, simple software. Small data bases. Short bursts of calculations needed quickly on demand at irregular intervals. Highly arithmetic intensive operations.

COMPLEX ARITHMETIC VECTOR PROCESSOR (CAVP)

The block diagram of the CAVP given in FIGS. 1 and 3 show the interfaces CIF and HSBIF and the major processing elements of the CAVP, the embedded 1750A computer 100 and vector processing unit VPU. The 25 MHz interface CIF is the interface between the BUS C and the internal memories and registers of the CAVP.

As shown in FIG. 3, the embedded 1750A computer comprises a 1750A micromemory 300, a 1750A CPU 302, a 1750A memory 304, and control memories 306. In the vector processing unit, the vector processing element comprises a data and I/O memories with associated crossbars 320 and a complex arithmetic unit 322. The vector processing control comprises local execution control 308, configuration contorl 310, memory address generators 312, vector timing 314, AU micro 316 and configuration micro 318. The set of data buses HSB is shown going through the interface HSBIF, as might be the case for a ring bus network.

Control Interface (CIF)

The 25-MHz control interface provides a communication path between the bus C and CAVP internal memories and registers. In an operational mode, the bus C is used to download information from the system control computer and to control information between the CAVP and other modules on the bus C. The interface contains sufficient intelligence to require minimal attention from the module processor. Transfers can be initiated externally or from the embedded 1750A computer 100. It can perform DMA (Direct Memory Access) on the 1750A memory 304 on a cycle steal basis. It allows diagnostics to be run by a higher level computer utilizing built-in-test functions to control CAVP operation, and monitor CAVP status.

Embedded 1750A

The 25 MHz embedded 1750A computer can execute the full MIL-STD-1750A instruction set at a 3 MIPS (DAIS mix) rate, thereby enabling it to perform interface control functions and other computations efficiently. The embedded 1750A also utilizes the user defined opcode (4F) instruction to initialize each vector instruction performed in the VPU. The embedded 1750A has a 32K × 32-bit program memory which provides fast set-up of the VPU. The program memory is also 16-bit addressable, as required by the 1750A ISA, making it effectively 64K deep.

Vector Processing Unit

The 40 MHz vector processing unit supports over sixty instructions to perform high speed processing of real and complex vectors. The VPU consists of a vector processing element and a vector processing controller. The VPE provides storage of operands, performs vector arithmetic, provides storage of results, and provides buffering of HSBIF data. The VPC serves as an interface to the embedded 1750A and provides the appropriate control to the VPU based on what operands are to be used and what operation is to be performed. The VPC provides this control to the VPU based on initialization information received from the embedded 1750A during signal processing instruction set-up. The VPE is highly pipelined to allow a fast (40 MHz) clock frequency. To get the most benefit from it, the pipelined VPE is kept as fully utilized as possible because the VPC allows VPE operation to be concurrent with 1750A operation and vector data I/O via the HSBIF.

Vector Processing Control

Configuration control 310 provides the control signals that define which memories are to function as data memories and which memories are to function as I/O buffers. Local Execution Control (in block 308) provides status of the next instruction register and the vector processing element. A Next Instruction Register (distributed over blocks 308-318) is effectively a single level cache which normally gets loaded from the 1750A during signal processing instruction set-up and thereby frees the 1750A to continue. The local execution control block controls when a signal processing instruction in the next instruction register is loaded into the working registers to begin execution, based on the status. Memory Address Generators (MAGS) 312 provide automatic sequences of addresses to the memories to which they are connected. The counting sequence as well as the offset (starting address) and other sequencing parameters are programmable. Vector Timing Logic 314 generates read and write control to the MAGS 312 and data memories 320. The appropriate timing signals are generated from the programmable values of block size, start skew and end skew. Special FFT Logic (SPFFT in the vector timing logic block 314) is used to generate timing control for multi-stage instructions such as the FFT as well as timing control to the MAGS for FFT relates sequences. The Configuration Micro 318 provides signals that control the address source, data input and R/W control to each of the data memories for signal processing instructions. It also controls the routing of operands from the memories to the complex arithmetic unit for signal processing instructions. The Arithmetic Micro of block 316 controls the operation to be performed on the data in the arithmetic unit 322. Control is also provided to download micro code from the AU micro memory of block 318 to memory which resides on the PLAU chips of unit 322 concurrent with execution.

Vector Processing Element

The vecotr processing element 106 consists of the two blocks shown in FIG. 3. The data memory 320 of the vector processing element contains ten 8K × 32-bit memories, each of which can be configured to perform one of the following: (1) input buffer, (2) output buffer, or (3) data memory. A maximum of four of the ten memories can be configured as I/O buffers at one time.

Reconfiguration of the memories occurs under 1750A control. Crossbars provide the necessary multiplexing of input-output data from the data I/O memories to the complex AU and HSBIF. Barrel shifters precede AU inputs for performing block floating point. Table look-up can be performed direct from any memory (i.e., can be done on any instruction). Two table look-ups can occur simultaneously.

Arithmetic Unit

Figure 6:
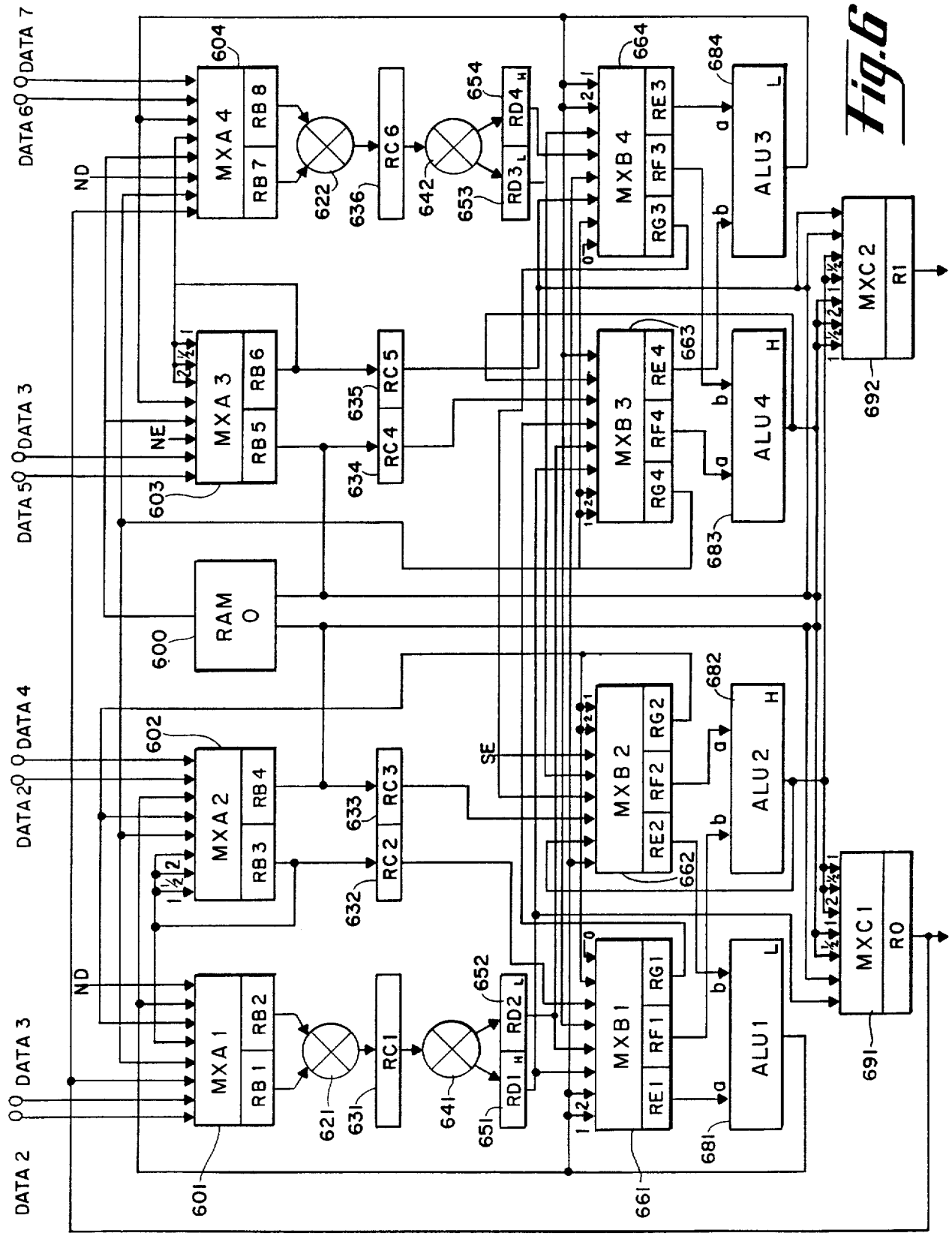
FIGS. 6 and 7 are block diagrams of different embodiments of a pipeline arithmetic unit VHSIC chip.
Figure 7:
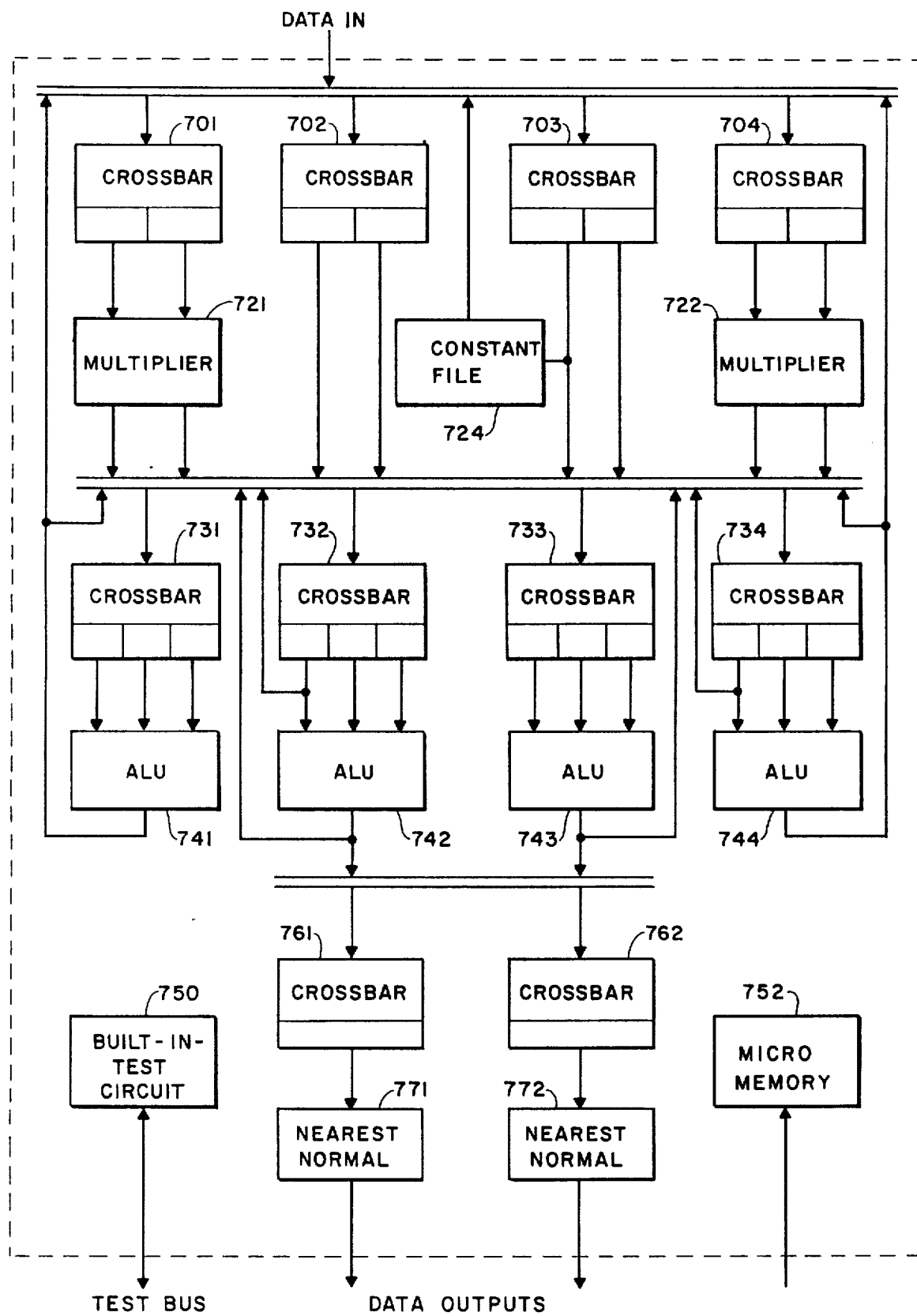

The arithmetic unit 322 (comprising two PLAU chips as shown in FIGS. 6 or 7) is pipelined to do computations at 40 MHz clock rate. It contains four 16 ×16 multipliers with rounding capability, and eight ALUs with look-ahead carry, each ALU being capable of performing twentyy-two different functions. There are micro control of all functional components and registers. Two function modifiers allow circuit configuration to be altered based on current data. The arithmetic unit also contains controllable multiplexers for scaling by two or one-half. They are capable of adding, subtracting, and integrating in double precision. The unit detects overflow, normalization, zero and sign. A variable pipeline length is determined by computation requirements.

40 MHz High Speed Bus Interfaces

The 40 MHZ high-speed bus interface HSBIF is the interface between four 40 MHz 16-bit high speed buses and the input and output buffer memories of the CAVP. The interface HSBIF is used primarily for I/O of vector data to be operated on by the vector processing unit. Both input and output can occur simultaneously with vector processing in the VPU. The HSBIF includes a buffer for header data used to setup processor program, and parity and retry circuitry. It interfaces independently with the hierarchical multiprocessor system controller on input/output operations.

OPERATION OVERVIEW

Figure 4B:
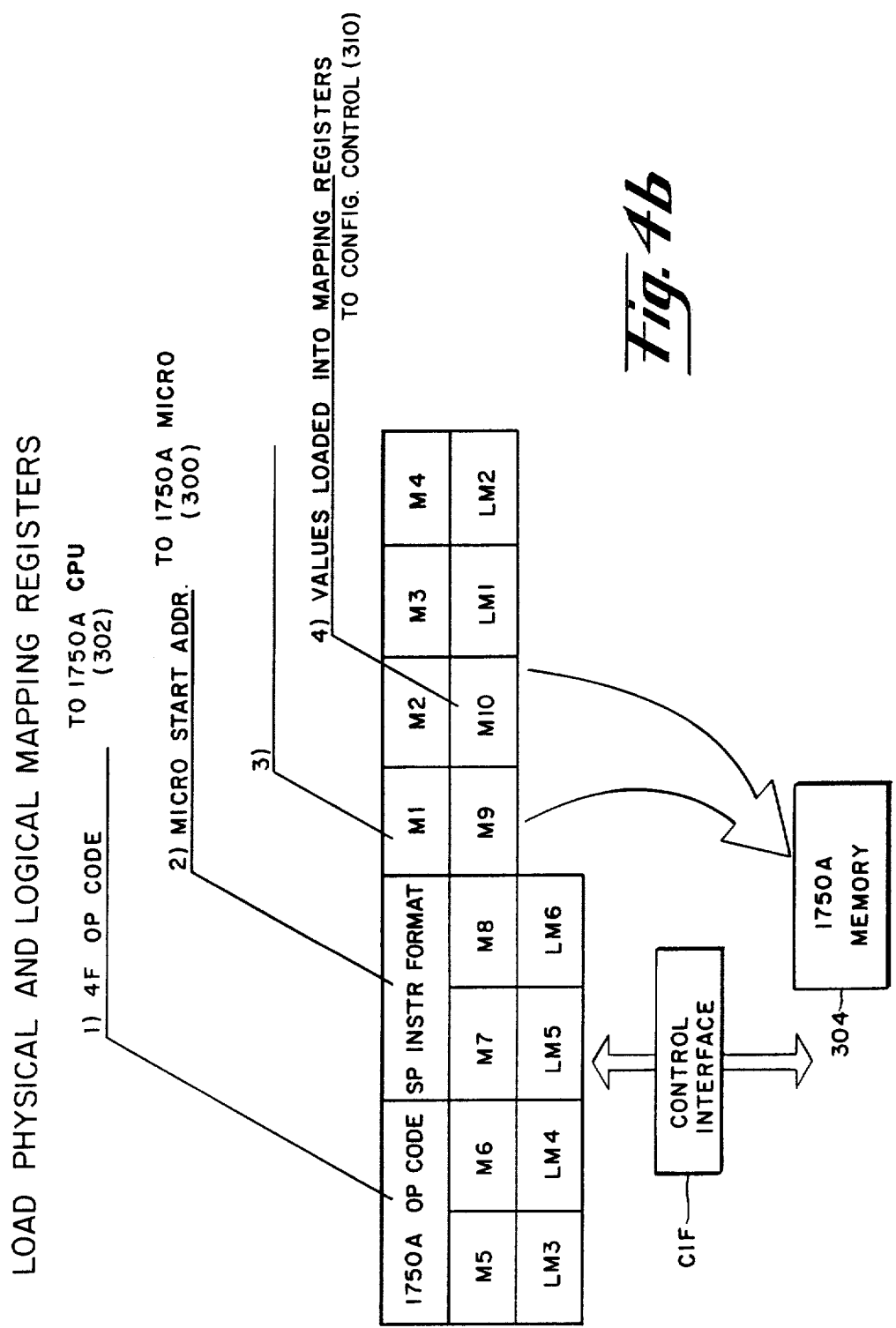
Figure 4C:
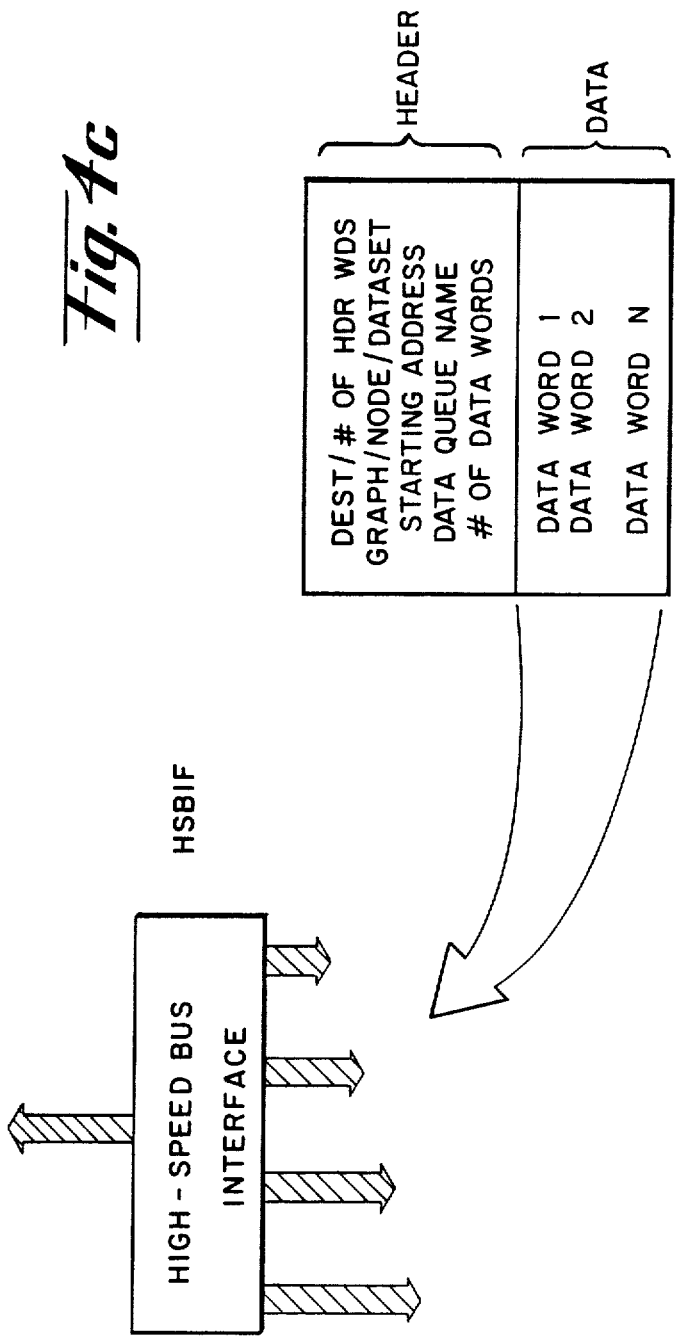

FIGS. 4A-4D relate to the diagram of FIGS. 3 and 3A to show some operating features with typical instruction words. FIG. 4A shows an operation for loading input/output mapping registers, FIG. 4B shows an operation for loading physical and logical mapping registers, FIG. 4C shows a vector data input operation, and FIG. 4D shows an operation for signal processing instruction setup.

ARCHITECTURE DECISION SUMMARY

A number of decisions relate to details of the architecture.

FFT Scaling/Hardware Impact of Block Floating Point

There is an impact of block floating point on the FFT (fast Fourier transform) scaling hardware, because the gain associated with FFT could cause overflow (i.e., loss of answer) if precautions are not taken. Some form of scaling must be performed, such as scale-sat logic as in previous machines, or automatic scaling which results from having block floating point capability.

With sat/scale logic, a programmer (who may or may not know what the data looks like) specifies a scale word. Each bit in the word provides the scale value for each corresponding FFT stage, the data output of the arithmetic unit is scaled by ½ or 1 depending on the scale value, the number of overflows that occur are accumulated, and the software must continually check the number of overflows and adjust the scale words accordingly with still no guarantee that the proper scaling has been performed.

To implement BFP requires barrel shifters between the data memory and the arithmetic unit for data alignment. It also must detect how close to normal is the element in the vector which is most normal. This capability allows autoscaling to be performed. At the completion of each FFT stage, overflow on the next stage can be based on how close to normal the result is. Scale factors can be generated appropriately with no programmer intervention.

The conclusion has been to implement a block floating point because it does not increase the module size significantly more than scale/sat logic, it allows FFT autoscaling, it does not impact fixed point instructions or their efficiency, it simplifies software, it allows greater computational range, the impact to the PLAU is minor, and only one new gate array type, a barrel shifter, is required.

Number and Capabilities of Data Memories

The functional requirements are to provide sufficient memory that signal processing (SP) instruction throughput is not limited by the memory throughput, and to provide sufficient buffering that input/output with a high-speed bus system is done concurrent with SP instructions. The processor throughput should not be limited by I/O buffering throughput. It was decided to use ten memories in the data memory 440, with the memories not paired and with flexible I/O because it possesses the maximum capability per area and the amount of area necessary to implement it is not excessive. Any memory can be configured to perform as input or output buffer.

Logical and Physical Memory Mapping

It is given that independent program segments will be executed with their order of execution being unknown, and that it is required to perform I/O overlapped with execution on a ten-memory structure. Each memory can play the role of input buffer, output buffer or processing memory based on how it is configured. The givens are satisfied if each program segment is compiled in terms of logical I/O and logical processing memories making it independent of the memory configuration. It is therefore necessary that the memory configuration occur in hardware through a set of mapping registers. The mapping registers specify which memories are I/O buffers, which memories are processing memories, logical to physical memory association.

Figure 5:
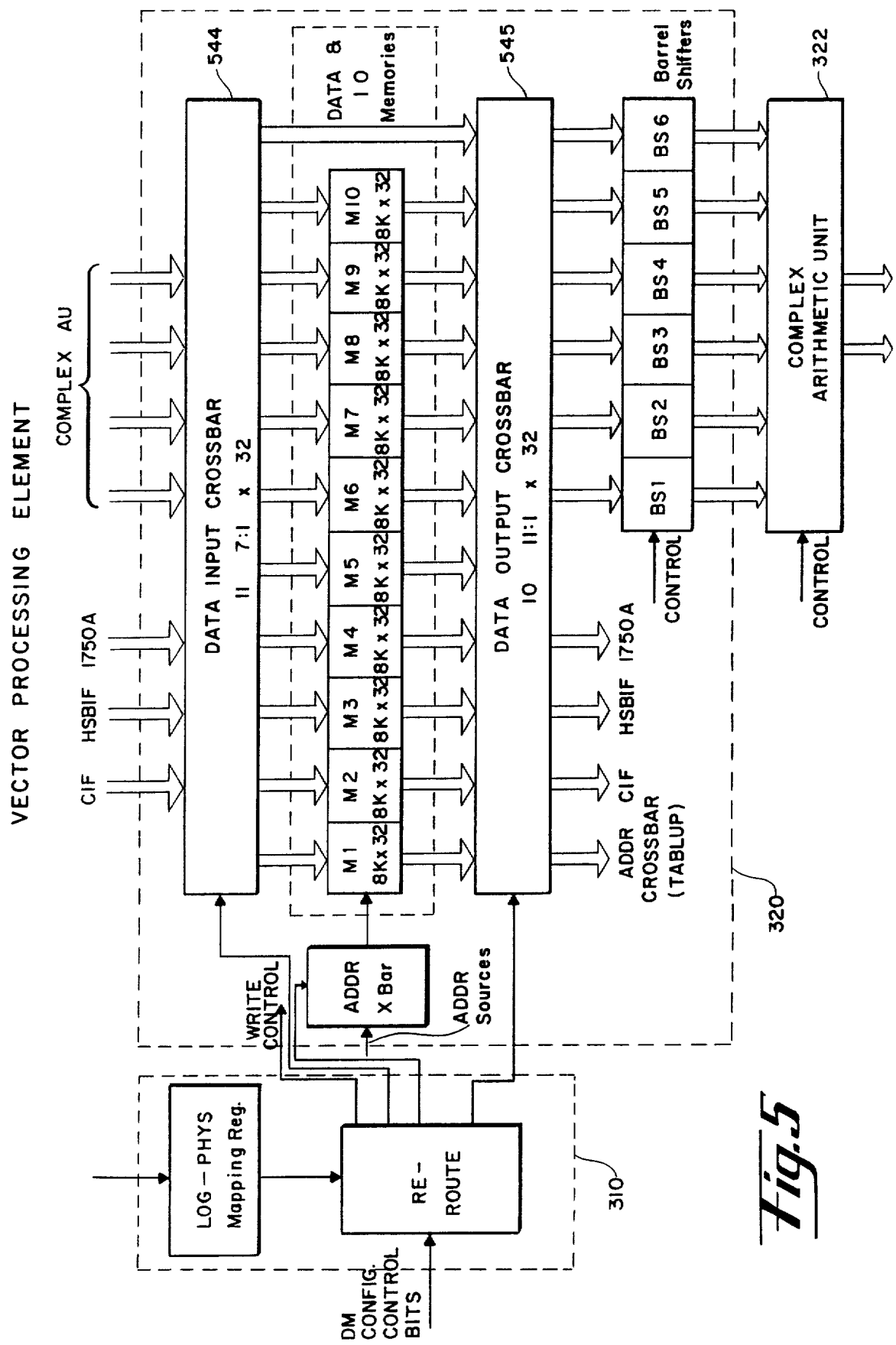
FIG. 5 is a functional block diagram of the vector processing element VPE.

FIG. 5 is a functional block diagram of the vector processing element VPE, showing the ten memories M1-M10 of the data memory, data input crossbar 544, and data output crossbar 545.

Data Memory Configuration Control Bits

The data memory configuration control bits provide control to memories which contain operands or store results during a SP instruction. The unique control provided to each memory consists of data input crossbar select to control which arithmetic unit outputs are routed to the memory, address crossbar select to control which address source of the memory address generator is routed to the memory, and memory write control which specifies read or write memory. In addition a data output crossbar select controls data routing from the memories to the arithmetic unit inputs as required for the instruction to be performed. This information is derived from what operands are to be used, what memories they reside in, and what operation is to be performed. The control bits are therefore generated by the compiler. The compiler creates the code in terms of logical memories. The control gets routed to the appropriate physical memory as defined by the mapping registers. These bits may reside in the macro instruction or the configuration micro, with consideration to the method used for multi-stage memory switching.

Multi-Stage Memory Switching

The functional requirements for multi-stage memory switching are that (a) the input memories must reverse roles with output memories from stage to stage, (b) the two output memories must reverse roles as a function of what stage is being performed, and (c) the two input memories must reverse roles as a function of what stage is being performed. The reasons are (a) results from the current stage becoming operands for the next stage, and (b) and (c) allow operands which are involved in the same computation in the next stage to be accessed at the same time. The control can originate from a macro instruction or a configuration micro. A configuration micro has been chosen because switching can be done by jumping to another line of code, it is less hardware intensive, and it is easier to implement.

Number of Memory Address Generators (MAGS)

Previous machines have used four MAGS. The MAGS must be shared during instructions which require greater than four memories. This limitation ultimately affects the throughput. The CAVP originally had six MAGS to alleviate this constraint. However recent developments in image processing application shows the need for eight MAGS.

Determination of Crossbar Configurations

Definition: A crossbar consists of L data inputs, each of bit width M, N data outputs also of bit width M, and N control inputs of bit width $\log_2 L$. Each control output is associated with a data output. This control input specifies to which of the L data inputs its associated output will be equal. In summary, a crossbar performs the logical function of one or more multiplexers each with common inputs and independent control.

Application: The crossbar gate array can be configured to perform one of eight different crossbar functions. A wide range of configurations is most hardware efficient because it allows one or omre crossbar gate arrays to be closely matched to the total crossbar function that must be performed (thus avoiding waste). Multiple crossbar gate arrays can be used together to achieve wider bit lengths or a greater number of multiplexers. The eight configurations have been analytically chosen to minimize the total number of gate arrays required to implement the crossbar functions required in the VHSIC CAVP and VSP modules.

DETAILED SPECIFICATION

CAVP Signal Processing Data Formats

Single Precision Fixed Point Real (SPFXR)
16 Bit
```
               15 14                    0
                S       Real
```
Double Precision Fixed Point Real (DPFXR)
32 Bit
```
31 30                                   0
  S                 Real
```
Double Precision Fixed Point Complex (SPFXC)
16 Bit Real
16 Bit Imaginary
```
31 30             16 15 14              0
  S     Real        S       Imag.
```
Double Precision Fixed Point Complex (DPFXC)
32 Bit Real
32 Bit Imaginary
```
31 30                                   0
  S                 Real
  S                 Imag                0
```
Single Precision Block Floating Point (SPBFP)
  8 Bit Exponent          ⎫
                          ⎬ Entire Vector
  8 Bit Max. Norm. Value  ⎭
  160 Bit Mantissa        } Each Element
```
31 30   24 23     16 15 14     8 7      0
  S      Exponent   S         Max. Norm. Value
  S                 S              Mantissa
```
Single Precision Block Floating Point Complex (SPBFC)
  8 Bit Exponent          ⎫
                          ⎬ Entire Vector
  8 Bit Max. Norm. Value  ⎭
  16 Bit Real Mantissa    ⎫
                          ⎬ Each Element
  16 Bit Imaginary Mantissa ⎭
```
31 30   24 23     16 15 14     8 7      0
  S      Exponent   S         MAX. Norm. Value
  S   Real Mantissa  S         Imag. Mantissa
```

CAVP Signal Processing Instruction Formats

Format 1
  Two Memory Instruction
| 1750A | SP Instr. Format | AU Micro Starting Addr. |
|---|---|---|
| Op | Config. Micro. Start. Addr. | 01 |
| Code | I1 | 02 |
|  | I2 | N |

Format 2
  Three Memory Instruction
| 1750A | SP Instr. Format | AU Micro Starting Addr. |
|---|---|---|
| Op | Config. Micro. Start. Addr. | 01 |
| Code | I1 | 02 |
|  | I2 | 03 |
|  | I3 | N |

Format 3
  Four Memory Instruction
| 1750A | SP Instr. Format | AU Micro Starting Addr. |
|---|---|---|
| Op | Config. Micro. Start. Addr. | 01 |
| Code | I1 | 02 |
|  | I2 | 03 |
|  | I3 | 04 |
|  | I4 | N |

Format 4
  Five Memory Instruction
| 1750A | SP Instr. Format | AU Micro Starting Addr. |
|---|---|---|
| Op | Config. Micro. Start. Addr. | 01 |
| Code | I1 | 02 |
|  | I2 | 03 |
|  | I3 | 04 |
|  | I4 | 05 |
|  | I5 | N |

Format 5
  FFT
| 1750A | SP Instr. Format | AU Micro Starting Addr. |
|---|---|---|
| Op | Config. Micro. Start. Addr. | 01 |
| Code | I1 | 02 |
|  | I2 | 03 |
|  | I3 | 04 |
|  | I4 | 05 |
|  | I5 | N |
| BSFFT | NSFFT    FFTN |  |

Format 6
  Six Memory Instruction
| 1750A | SP Instr. Format | AU Micro Starting Addr. |
|---|---|---|
| Op | Config. Micro. Start. Addr. | 01 |
| Code | I1 | 02 |
|  | I2 | 03 |
|  | I3 | 04 |
|  | I4 | 05 |

-continued

|  | I5 | 06 |
|---|---|---|
|  | I6 | N |

Format 7
    1750A-----Data Memory/Header
        Buffer/Control Memory Transfer
1750A Op Code  SP Instr. Format      1750A Starting Addr.
  DM/HDR BFR/CM Start. Addr.      # Of Words
D L1 L2 Q1 Q2 C
Format 8
    Load Physical & Logical Memory
    Mapping Registers
1750A        SP           M1    M2    M3    M4
Op Code    Instr. Format
  M5    M6    M7    M8    M9    M10    LM1    LM2
  LM3    LM4    LM5    LM6    o o o    LM10
Format 9
    Load I/O Mapping Registers
1750A     SP           I01    102    103    104
Op Code   Instr. Format
I05  I06  LIO1  LIO2  LIO3  LIO4  ////////////
Format 10
    Conditional branch on Vector Conditions
1750A Op Code    SP Instr. Format           C    Cond
    Branch Address
Format 11
    Set/Reset/Toggle Flags
1750A Op Code   SP Instr. Format            OP    Flag CAVP Signal Processing Instruction Format
Description 1750A Op Code - Specifies the instruction to be performed. The user definable Op Code (4F) is used to designate a signal processing instruction.

Signal Processing Instruction Format - Specifies one of the eleven signal processing instruction formats. This is used to provide an entry point into the 1750A micro code which will control the instruction fetch corresponding to the specified format.

Arithmetic Micro Starting Address - Provides an entry point into an arithmetic micro memory routine which corresponds to the signal processing instruction to be executed.

Configuration Micro Starting Address - Provides an entry point into a configuration micro memory routine which corresponds to the signal processing instruction to be executed.

O1-6 - Pointers to the O control memory which contains MAG offset (starting address) values)

I1-6 - Pointers to the I control memory which contains MAG increment values, bit reverse numbers or bit twist numbers N - Pointer to the N control memory which contains the N (number of elements in the vector) value.

FFTN - Specifies the FFT size

NSFFT - Specifies the number of FFT stages to be performed.

BSFFT - Specifies the beginning stage of an FFT.

Format 7
    D - Specifies the direction of the transfer
        0    1750A    to           DM/HDR BFR/CM
        1    DM/HDR BFR/CM    to    1750A
    L1,2 - Specifies the transfer port
        00    Data Memory      10    Control Memory
        01    Header Buffer      11    Unused
    Q1,2 - Specifies the data format on a DM transfer
        00    32 Bit           10    16 Bit Lower Half
        01    16 Bit Upper Half  11    Spare
    C - Specifies the execution contingencies
        0    Unconditional
        1    Mapping next instruction register empty Format 8
    M1-10 - Specifies the logical memory or logical I/O port associated with each of the ten physical memories
        0 - LMI        5 - LM6        8 - I/O3
        1 - LM2        6 - I/O1        9 - I/O4
        2 - LM3        7 - I/O2        10 - None
        4 - LM5
    LM1-6 - Specifies the physical memory associated with each of the six logical memories.
        0 - M1         5 - M5         8 - M8
        1 - M2         6 - M6         9 - M9
        2 - M2         7 - M7         10 - M10
        4 - M4

Format 9
    I$\phi$1-4 - Specifies the physical I/O port associated with each of the four logical I/O ports.
        0 - CIF        2 - HSB1       4 - HSB3
        1 - 1750A     3 - HSB2       5 - HSB4

Format 10
    C - Execution contingent on No Instructions Executing or Pending.
    Cond - Conditions as follows:
        0  No Instructions Executing or Pending
        1  Next Instruction Register Available
        2  Mapping Next Instruction Register Available
        3-6  AU Conditions
        7-10  I/O Status Flags Format 11
    OP - Specifies the Operation
        00 - Set            10 - Toggle
        01 - Reset         11 - Unused
        Flag - Specifies which flag
        0-3               I/O Status Flags

CAVP INSTRUCTION SET

| Instruction Class | Instruction Type | Mnemonic |
|---|---|---|
| Arithmetic | Absolute Value | CCOMP |
|  | Accumulate | DPACC |
|  | Add | ADD |
|  |  | CADD |
|  |  | DPADD |
|  |  | CDPA |
|  | Divide | DIVIDE |
|  | Multiply-Accumulate | ARMPY |
|  |  | CMSAD |
|  |  | MCSAD |
|  | Multiply | CMPY |
|  |  | CMPYX2 |
|  |  | FLMPY |
|  |  | RMPYI |
|  |  | RRMPY |
|  |  | CMPYC |
|  |  | CMPYR |
|  |  | RCMPY |
|  |  | RMPYC |
|  |  | CMCD |
|  | Multiply-Add | DRMADD |
|  |  | DIMADD |
|  |  | MADD |
|  |  | MADD2 |
|  |  | RMPYAI |
|  |  | DRCADD |
|  |  | MADD3 |
|  |  | MADD3S |
|  |  | RMPYAC |
|  | Multiply-DP Result | SXMPY |
|  |  | DXMPY |
|  | Subtraction | SUB |
|  |  | DPSUB |
| Logical | And | AND |
|  | Not | NOT |
|  | Or | OR |
|  | Xor | XOR |
| Signal Processing | Filter | FFT |
|  |  | WFFT |
|  |  | POLEI |

-continued

| Instruction Class | Instruction Type | Mnemonic |
|---|---|---|
| | | ZEROI |
| | | POLEIREC |
| | | P2Z2 |
| | | QUAD |
| | Count Threshold | CNTH |
| | Detect | DET |
| | Detect Squared | DETSQ |
| | Table Lookup | TABLUP |
| | | TABLUPI |
| | Expand | EXPND |
| | Compact Vector | COMPACT |
| | Normalize | NORMALIZE |
| | Spectrum Separate | SS |
| | Spectrum Combine | SC |
| Conditional | Max Vector | RMAXV |
| | | CMAXV |
| | Max Word | RMAXW |
| | Min Vector | RMINV |
| | | CMINV |
| | Min Word | RMINW |
| | Scale V | SCALEV |
| | Valid | VALID |
| Format Conversion | Convert to Complex | CVRTCX |
| | Convert to SP | CVRTSP |
| | Pack | PACK |
| | Unpack | UNPACK |
| | DP Extent | DPEXT |
| | Convert to DP | CVRTDP |

Some Instruction Definitions for the CAVP

ADD  Addition of two real vectors
     A + JA* where A, B, C are real quantities
     B + JB*       A*, B* are zero
     C AND  Logical "AND" function
     Performs a bit by bit logical 'anding' of two input vectors

| A | B | A and B |
     |---|---|---|
     | 0 | 0 | 0 |
     | 0 | 1 | 0 |
     | 1 | 0 | 0 |
     | 1 | 1 | 1 |

ARMPY  Accumulate real multiply
       An integrate and dump or a transversal filter
       $C_x \sum_N (A_i \cdot B_i)$ where N = size of the vector
       A, B are single precision elements of the vector CADD  Complex Addition
      Complex addition of two single precision vectors
      A + JA* Where A, B, C are real quantities
      B + JB*        A*, B*, C* are complex quantities
      C + JC*

CCOMP  Conditional Complement
       Obtain the magnitude of the real single precision input signal
       If $A \geq 0$ then output = A
       If $A < 0$ then output = 2's complement of A CLRAU  Clear AU
       Clear all AU registers to '0'

CLRM0  Clear memory to '0'
       Clear specified memory locations to zeroes

CLRM1  Clear memory to '1'
       Clear specified memory locations to ones

CMPY  Complex multiply
      Complex multiplication of two N-point single precision complex vectors
      C = (A + JA*)(B + JB*)
        = (AB − A*B*) + J(AB* + A*B)

CMPYC  Complex multiply and conjugate
       Complex multiplication of two complex quantities
       and form the single precision complex product and
       their difference terms within the product.
       C = (A + JA*)(B + JB*)
         = (AB − A*B*) + J(AB* + A*B)
             Form         Form
         (AB + A*B*)   (AB* − A*B)

CMPYX2  Complex multiplication by 2

-continued $2(A + JA*) = 2A + 2JA*$ Where $(A + A*)$ is
the single precision results of a complex
multiplication CNTH  Accumulate the number of thresholds
      Determine the number of input signals which are
      greater than a preset threshold. Input and output
      vectors are single precision. If signal > threshold
      then AC = AC + 1 where AC = Accumulator.

COMPACT  Compact vector
         Compacts input vector "A" with respect to
         threshold vector "B". If > B then output = A.
         else output = null (don't store it), A = Complex CRMPY  Complex recursive multiplication
       $Z_{Zn-1} = Z0 \underset{i=1}{\Omega} X_{Zi-1}$ CVRTDP  Convert to double precision
        Convert a single precision input vector to a double
        precision output. Equivalent to a scaling of
        $2^{-15}$ with rounding.
        DDDDDDDDDDDDDDDDD =
        SSSSSSSSSSSSSSSSDDDDDDDDDDDDDDDDD
        S is the SE of D CVRTSP  Convert to single precision
        Convert a double precision input vector to a
        single precision output. Equivalent to a scaling of
        $2^{+15}$ with rounding.
        DDDDDDDDDDDDDDDDDDDDDDDDDDDDDDDD =
        → DDDDDDDDDDDDDDDX DET  Detect
     Calculates (A!U + JB!V!) and (A!V! + JB!U!) and
     selects the larger of the two.
     U, V are components of the complex number (U + JV)
     A, B are user supply constants
     input = single precision complex quantity
     output = single precision real quantity
     output = A[MAX (|U|, |V|)] +
              B[MIN (|U|, |V|)]
     For A = 1 and $\frac{3}{8} < B < \frac{1}{2}$,
     output = $(U^2 + V^2)^{.5}$ DETS0  Detect squared
       for input vectors (XU + JXL), (YU + JYL)
       Single precision
       computes RE[XY*] = RE[(XU + JYL)(YU − JYL)]
                       = RE[XUYU − J(XUYU) +
                            J(XLYU) + XLYL]
                       = RE[XUYU − J(XUYU) +
                            J(XLYU) + XLYL]
                       = XUYU + XLYL;
                         Double Precision DIMADD  Double image add
        performs a complex multiply of two single
        precision inputs and scales the product
        by $2^{-15}$ in converting to a double precision
        format. The imaginary portion is summed in double
        precision with a third input vector.
        W + JW*, X + JX* = 32-bit complex
        0 + JY* = 32-bit imaginary
        Output = IM[(W + JW*)(X + JX*)]$(2^{-15})$ +
        JY*

DIVIDE  Division
        Division of two single precision real vectors Ex.
        input vectors A, B, implement A/B.
        (B)(P0) = P1
        (B)(P0) = P2
        (B)(P0)(P1)(P2) = P3
        (B)(P0)(P1)(P2)(P3) = 1 and
        (A)(P0)(P1)(P2)(P3) = A/B CPACC  Double precision accumulate performs a signed
       double precision sum of single precision input,
       output = $X(2^{-15})$ where X = input vectors DPADD  Double precision add
       performs signed double precision sum of two
       double precision vectors. X, Y, Z = 32 bit real
       Z = X + Y DPEXT  Double precision extend
       Addition of a double precision real vector to a
       single precision real vector with sign extens.
       Input vectors (AU, AL), (Sign Ext, BU)
       Output = (AL + BU), (AU + Sign Ext + CO)

DPMADD  Double precision MADD
        Performs a DRMADD on a half AU and a
        DIMADD on the other half AU.

-continued

| | |
|---|---|
| DPSUB | Double precision subtract<br>Performs a signed double precision difference of two double precision vectors.<br>X, Y, Z = 32 bit read<br>Z = X − Y |
| DRCADD | Double real by complex add<br>Takes two vectors, (W + JW*), (X + JX*), multiply them by real constants K1, K2 respectively, and add the result to vector (Y + JY*).<br>Output = K1(W + JW*) + K2(X + JY*) + Y + JY*<br>= (k1W + K2X + Y) + J(K1W* + K2X* + Y*)<br>K1, K2 are real quantities packed as complex numbers |
| DRMADD | Double real MADD<br>Performs a complex multiply of two single precision inputs and scales the product by 2 −15 in converting to a double precision format. The real portion is then summed in double precision with a third input vector.<br>W + JW*, X + JW* = 32 bit complex<br>Y + $Y^0$ = 32 bit real<br>Output = RE[(W + JW*)(X + JX*)](2 −15) + Y |
| DXMPY | Double precision multiply<br>Performs a 64 bit real product of two 32 bit real input vectors |
| FFT | Fast Fourier Transform<br>Performs a fast fourier transform on a given time series data block. The basic computation of the FFT consists of performing a complex butterfly in the form 9a = bc0 and (A − BC) where:<br>A = upper half of F(T)<br>B = lower half of F(T)<br>C = weight vector |
| FLMPY | Full length multiply<br>Performs a full length 16 × 16 multiply and outputs the lower 16 bits. The higher order 16 bits are expected to be all zeroes. If not, the low 16 bits will be set to positive saturation. This instruction is used to perform integer multiplication.<br>X, Y = 16 bit real<br>Z, XY = (16 bit real) |
| LDAU | Load AU<br>Load AU registers with some constant |
| MADD | Multiply and add<br>This instruction is used for various recursive and transversal filters. The input is three complex vectors (W, X, Y). The output is of the form Z = WX + Y where W, Y, and Z are each 32 bits (16 real, 16 imaginary). |
| MADD2 | Real multiply, complement product, add 1 vector.<br>This instruction is used to scale a vector, then add it to a vector.<br>K = KU + KL (packed such that KU, KL are real)<br>W, X, Y, Z = single precision complex<br>Z = −[KUWU + J(KLWL)] + X |
| MADD3 | Real multiply, complement product, add 2 vectors<br>This instruction is used to scale a vector then add it to two other vectors.<br>K = KU + KL (Packed such that KU, KL are real)<br>W, X, Y, Z = single precision complex<br>Z = −[KUWU + J(KLWL)] + X + Y |
| MADD3S | Multiply and add multiple vectors<br>This instruction is used to scale a vector W by the quantity K (packed real 16 bit upper) and then added to two complex vectors.<br>Output = −KUW + + X + Y where W, X, Y, Z are single precision complex. |
| NORM | Normalize<br>Normalize a 16 bit input vector 'X' to its binary characteristic. If (X = 0.00 . . . 0 or 0.1X . . . X or 1.0X . . . X) then output = 0, else output = # of 0 if X is positive or output = # of 1 if X is negative. |
| NOT | Logical 'Not'<br>Performs a bit by bit logical 'NOT' of two input vectors |

-continued

| | |
|---|---|
| | A : Not A<br>0 : 1<br>1 : 0 |
| OR | Logical 'Or'<br>Performs a bit by bit logical 'OR' of two input vectors<br>A : B : A or B<br>0 : 0 : 0<br>0 : 1 : 1<br>1 : 0 : 1<br>1 : 1 : 1 |
| PACK | Pack two complex vectors into one<br>Packs two complex vectors into one vector, retaining eight bits of significance.<br>X, Y − single precision complex or packed real<br>Y = Y(2 −8) shift it 8 places to the right 'and' it with 377 (oct) to mask out low order 8 bits<br>X is 'and' by 1774 (Oct) to mask out higher order 8 bits then output = X + Y A packed vector |
| POLE 1 | One pole filter<br>Implements a complex feed back of a one pole filter<br>Given: Input vector A, constant vector C<br>Then: Do a table look up for a vector D to implement<br>CD + A which is the output |
| POLE1R | One pole recursive filter<br>One pole recursive filter<br>Given: Input vector (A0, A1, . . . ),<br>Constant vector (C0, C1, . . . ),<br>Constant B0<br>Then: Output 0 = (C0(B0 + A0 = B1<br>Output 1 = (C1)(B1) + A1 = B2<br>In General: Output [1] = (C[1])(B[1]) + A[1] = BLI + 1] |
| PIZI | One Pole one zero filter<br>Performs a one pole one zero filter on a vector using complex coefficients K1 and K2.<br>Given: Input vector (AU, A1, . . . ),<br>Constant Vector K10, K11, K12, . . . ),<br>(K20, K21, K22, . . . ),<br>Constant B0<br>Then: B1 = B0(K10) + A0<br>Output 1 = B1(K21) + B1<br>B2 = B1(K1) + A1<br>Output 2 = B2(K22) + B2<br>In General: Output [1] = (B[1])(K1[1]) + B[1]<br>where: B[1] = (B[1 − 1])(K1[1 − 1] + A[1 − 1], I = 1, N − 1 |
| P2Z2 | Two Pole Two Zero Filter<br>Performs a two pole two zero on a vector using complex coefficients K1, K2 and K3.<br>Given: Input vector (A0, A1, . . . ),<br>Constant Vector (K10, K11, K12, . . .),<br>(K20, K21, K22, . . . ) and (K30, K31, K32, . . . )<br>Then: Output [1] = A[1 − 1](K1[1] + K2[1]) + A[1 − 2](K3[1] + 1) + INPUT[1]<br>Where A[1] = A[1 − 1](K2[1]) + A[1 − 2](K3[1]) + INPUT [1]<br>A[0] = B0, A[1] = B1 |
| RCMPY | Real by complex multiply<br>This instruction is designed to provide time domain weighting, gain control, and shifting for scaling. A complex vector is multiply by a real vector.<br>Output = B(A + JA*) = AB + JA*B<br>where input and output are both single precision quantities. A, B are real and A* is complex. |
| RMAXV | Maximum vector<br>Compares two vector which represents the maximum value of each vector element.<br>EX. X = 2143321<br>Y = 9213040 Then Z MAX[(E(X), E(Y)] = 9243341. |
| RMAXW | Maximum word<br>Finds the maximum value within a real vector.<br>Maximum value is stored in the lower half of the word.<br>Ex. X = 01232967 Then output = 9 |
| RMINV | Minimum Vector<br>Compares two vectors element to element and |

| | -continued |
|---|---|
| | outputs of a composite vector which represents the minimum value of each element. |
| | Ex. X = 00982134 |
| | Y = 12686674 Then Z = MIN[(X), (Y) = 00682134 |
| RMINW | Minimum word |
| | Finds the minimum value within a real vector. Minimum value is stored in the lower half of the word. |
| | Ex. X = 27364422 Then Output = 2 |
| RMPYAC | Real Multiply Add |
| | Performs two real multiplications and sums their results |
| | E = AB + C0 where A, B, C, D, E are all single precision real |
| RMPYAL | Real Multiply and Add on 1 vector |
| | Performs a real multiply and add using three input vectors |
| | Let K = packed real quantity |
| | X, Y, Z = single precision real quantity |
| | Then Z = KLX + KUY |
| RMPYC | Real Multiply Conjugate |
| | Produces the conjugate of the packed real multiplication of the input |
| | Let X = packed real quantity |
| | Y, Z = single precision complex |
| | Then Z = XUYU − J(XLYL) |
| RCMPY | Real by Complex Multiply |
| | Performs a scaling function on a complex vector |
| | Let X, Z = single precision complex |
| | Y, = packaged real (only upper 16 bits used) |
| | Then Z = XYU |
| RRMPY | Real by Real Multiply |
| | Takes two vectors A and B and generates a vector C which is the products of the element components. |
| | X, Y, Z are single precision packed real quantities |
| | Z = (XUYU, XLYL) |
| SCALEV | Scale vector determinator |
| | This instruction will output either the upper 16 bits of the Y vector or the lower 16 bits of the Y vector based on the logical test LKWL KUXL |
| | Let K = single precision real packed (usually 40 OCT) |
| | W, X, Z = single precision real quantities |
| | Y = single precision packed real quantity |
| | Then Z = 0, YL if test is true |
| | = 0, YU if test is false. |
| SUB | Subtraction of two real vectors |
| | A + JA* where A, B, C are real quantities |
| | B + JB* A*, B* are zero |
| | C |
| SWAP | Swap |
| | Swaps the upper 16 bits with the lower 16 bits of a word |
| SXMPY | Single by complex multiply |
| | This instruction forms a signed double precision product from a one single ad one double precision operand. |
| | Let X = packed only upper 16 bits real |
| | Y, Z = double precision real quantity |
| | Then Z = XUY = XU)YU + 2 −15(YL)) |
| | Note: The lower 16 bits of the Y vector element are used only for rounding purposes. |
| UNPACK | Unpack |
| | This instruction unpacks one packed real vector into two complex vectors. |
| | Let XU, XL, YU, YL = 8 bits each inputed in the following form: XU, YU = one word |
| | XL, YL = another word |
| | Then XU, XL is 'anded' with 177400 (Oct), YU, YL is 'anded' with 377 (Oct), to form XU, XL, YU, YL each 16 bits long. |
| VALID | Valid |
| | This instruction compares two vectors X and Y. After the comparison, an output vector is formed to indicate the result of the comparison. |
| | If X Y then output = 07777 (OCT) IE. A 'hit' |
| | If X = Y the output = 000000 (OCT) IE. A 'miss' |
| | X, Y = single precision real quantities) |
| | Z = double precision packed real quantity (32 bits) |

| | -continued |
|---|---|
| | Formatted as follows: ZI = # of hits |
| | ZL = hit/miss. |
| WFFTS | Weighted FFTS |
| | Multiplies the incoming vector of a set of weights K1 and K2, then performs the first stage of a FFT. |
| | Let: A = Upper half of F(T) |
| | B = Lower half of F(T) |
| | C = weight vector |
| | Then: output = A(K1) + B(K2) and A(K1) − B(K2) |
| XOR | Exclusive OR |
| | Performs a bit by bit logical 'exclusive or' on two input vectors |
| | A : B : A XOR B |
| | 0 : 0 : 0 |
| | 0 : 1 : 1 |
| | 1 : 0 : 1 |
| | 1 : 1 : 0 |
| ZERO 1 | Zero One Filter |
| | Performs a complex feed forward implementation for the filter. |
| | Let: A = input vector |
| | C = constant vector |
| | Then: output = A(C) + C |

CHIP DESCRIPTIONS

The common set of Westinghouse VHSIC chips form the building blocks for systems. Prime requisites for the VHSIC development were:
- a small quantity of chips for low risk and affordability
- wide applicability to insure high volume usage
- general and signal processing architechture which were self-contained to minimize external gate array requirements The VHSIC chips are:
- Pipelined AU (PLAU)
- Enhanced EAU (EAU)
- Program Controller (PC) or General Purpose Controller (GPC)
- 32 ×32 Multiplier (not used in the CAVP)
- 64K Memory (8K×8) (MEM)
- Gate Arrays (GA)

A summary of the chip types and quantities used in one recent embodiment of the complex arithmetic vector processor (CAVP) are shown in the following table.

| TYPE | NAME | QUANTITY | |
|---|---|---|---|
| Custom | General Purpose controller (GPC) | 1 | |
| | Extended Aritmetic Unit (EAU) | 1 | |
| | Pipelined Arithmetic Unit (PLAU) | 2 | |
| Subtotal | | | 4 |
| Gate Arrays | 1750A memory Control | 3 | |
| | Barrell Shifter | 4 | |
| | CAVP Control | 2 | |
| | CBUS Interface I | 1 | |
| | CBUS Interface II | 1 | |
| | Clock Distribution | 9 | |
| | Crossbar | 54 | |
| | High Speed Bus Interface | 3 | |
| | Memory Address Generator | 8 | |
| | Vector Timing | 2 | |
| Subtotal | | | 87 |
| Memory | 8K × 8 Static Ram | 125 | |
| Subtotal | | | 125 |
| Total | | | 216 |

Pipelined ARithmetic Unit (PLAU) Custom Chip

The Pipelined Arithmetic Unit (PLAU) is a general purpose, programmable, 40-MHz chip designed for use in advanced signal processors to perform high speed vector-efficient operations. The PLAU supports real and complex operations in addition to logical functions. More commonly, the PLAU is used in pairs to perform high speed complex processing applications. The PLAU can also be organized in a variety of pipelined configurations geared for specific signal processing applications. In the CAVP module, two of the chips are used in FIG. 3A as the unit 322.

Some functions that the PLAU can perform include the fast Fourier transform, recursive filtering, transversal filtering, matched filtering, convolutional filtering, spectrum, shifting, weighting and band limited interpolation. Each of these are performed under micro-program control. As a single unit in combination with data memories, the PLAU can perform a full butterfly in two clock times. If it is used in conjunction with a second PLAU, a fully butterfly can be output every clock cycle.

The result is that a stream of data is passed through a fixed control network. This makes very high speed possible. The pipelined AU operates with a single 40 MHz clock. Since it is microbit controlled, it has the speed of a hardwired system. It attains a high speed without sacrificing flexibility because the microbit control is applied to the entire design. This is to say that, in addition to controlling the functions of four ALUs and multiplexers, it provides inhibit controls to the registers; this makes it possible to cause them to retain their data unchanged if required.

The specific functional organization of one embodiment of the chip is shown in FIG. 6. The figure shows that each chip contains wo pipelined multipliers and four arithmetic logic units connected with each other and with the input/output buses through multiplexers and registers. Multiplexer 601 (MXA1) couples input busses via registers RB1 & RB2 to a multiplier 621, whose output goes to a register 631 (RC1) and then via another unit 641 to registers 651 (RD1$_H$) and 652 (RD2$_L$). Multiplexer 602 (MXA2) couples input busses via registres RB3 & RB4 to registres 632 (RC2) and 633 (RC3) respectively. Multiplexer 603 (MXA3) couples input busses via registers RB5 & RB6 to registers 634 (RC4) and 652 (RC5) respectively. Multiplexer 604 (MXA4) couples input busses via registers RB7 & RB8 to a multiplier 622, whose output goes to a register 636 (RC6) and then via another unit 642 to registers 653 (RD3$_L$) and 654 (RD4$_H$). Four multiplexers 661–664 (MXB1-MXB4) have inputs from various registers and busses as shown, and outputs via registers to four arithmetic logic units 681–684 (ALU1-ALU4) or back to other of the multiplexers. Two output multiplexers 691 (MXC1) and 692 (MXC2) have inputs from various of the preceeding units and outputs via their registers R0 and R1 respectively. The unit has been designed to be highly reconfigurable by microprogramming. Considerable emphasis has also been placed on equalizing the delays in sequential pipeline sections. This led to pipelining the multipliers and the placing registers both ahead and after each ALU. This feature optimizes the speed in vector computations without the need for resorting to multiple clocks. It is possible to bypass the multipliers if they are not needed and to bypass one ALU if only one is needed.

A recent embodiment of the PLAU chip is shown in FIG. 7. The major internal elements of the PLAU are two pipelined multipliers 721 & 722 and four ALUs 741-744 connected by crossbars 701-704, 731-734, 761 and 762 and registers. The unit is reconfigurable through micro-programming. Pin limitations have been overcome by multiplexing the microcode as it enters the chip. Microcode may be loaded for the next instruction concurrent with execution of the present instruction. In addition, four ALUs allow concurrent processing for singe or double precision computations.

The BIT (Built-In-Test) 750 Controller macro, which is resident on the chip, controls all testing within the PLAU based upon the commands and test data received on the Test Bus (T-Bus). The entire chip may be tested via the BIT Controller in a stand-alone configuration. When installed on a board, BIT Controllers on separate chips will test the connections and I/O buffers in paths between chips. Chip test is test cell oriented, a test cell being defined as a group of logic consisting of up to 5000 equivalent gates. Each test cell has test registers at all of its inputs and outputs, so that the cell may be completely isolated and controlled by the BIT Controller.

The flexibility of the PLAU is enhanced by its function modification capability, which is the changing of the ALU function or crossbar select code as a function of the processed data, thereby omitting frequent micro program jumps or making multiple passes on a vector under reconfigured AU states. The controlled flexibility allows the chip to be used for implementing a very wide range of data processing algorithms. This includes both real and complex functions. It can be used to perform in both single and double precision modes.

Summary characteristics of the PLAU are:

1. Pipelined to do computations at a 40MHz clock rate.
2. Two pipelined multipliers with rounding capability.
3. Four ALUs with look-ahead carry and function modify capability, each capable of performing twenty-two different functions.
4. On-chip micro-bit storage for rapid assessability.
5. Micro-bit control of all functional components and registers.
6. Allows general routing capability for various data flow.
7. Contains alterable circuit configuration based on current data (function modify feature).
8. Provides paths for passing data through or around the multiplier.
9. Provides feedback paths throughout the chip.
10. Contains controllable crossbars which provides for scaling by 2 or ½.
11. Capable of adding, subtracting, and integrating in double precision.
12. Detects overflow, normalization, zero and sign, from which flags are set or indicative patterns are outputted.
13. Variable pipeline length determined by computational requirements.
14. Expandable to multiple chip configurations to perform most arithmetic or logic functions.

It is important to note two features of the chip which enable the design to resist obsolescence. One is its extremely functional reconfigurability. The other feature is the extensive use of on-chip micro control.

Functional reconfigurability provides a function modification capability which is invaluable for optimizing the data processing speed; it provides the ability, for example, of changing the ALU function code or changing the multiplexer select code as a function of the processed data without the necessity for creating frequent program jumps or making multiple data passes under reconfigured AU states.

Wide control latitude which is attained through a chip architecture which is provided with an extensive amount of microcontrol for registers and multiplexers and for function selection.

Program Controller (PC)

The VHSIC controller design provides a flexible control function for use in data, signal and post processing systems. It is essential to any processor module since it defines the execution of instructions. In addition, it provides interfacing through the command bus to the system control computer. Using a micro-programmed architecture, the chip serves a hardware controller for numerous applications with common control requirements. An external, high-speed static micro memory stores the microcommand accessed and executed by the controller. Unique microcommand sets (firmware) for specific applications tailor the controller hardware for the control function required.

The controller is designed to support emulation of two primary, general purpose instruction set architectures (ISAs): AN/AYK-14(V) and MIL-STD-1750A. Unique emulation firmware for each ISA configures the controller hardware to support the specific ISA being emulated. Some ISA extensions (to be defined) are used to support signal processing systems using a GP embedded processor.

The VHSIC controller chip also performs major control functions for both signal and post processing applications. Dual memory ports are available for configurations requiring separate instruction and data operand memories. Facilities for connecting an external macro-RAM sequencer is also provided.

The controller consists of three functional sections: the micromachine, program control and instruction pre-evaluation. The micromachine is a microprogram sequencer implementing microprogrammed control over the devices connected to it. The micromachine contains logic for software instruction decoding, micromemory address sequencing, writable control store loading, status registers and status testing, event/interrupt control and microinstruction latching and decoding.

The program controller performs machine-level addressing functions supporting the addressing modes for data, signal and post processing applications. The program control logic is controlled by the microcontroller section of the VHSIC controller and contains program-/instruction counters, instruction buffer/prefetch logic, an adder for computing relative addresses and breakpoint logic to facilitate test and maintenance functions.

The VHSIC controller design provides a flexible control function for use in data and signal processing systems. Using a microprogrammed architecture, the chip serves as a hardware controller for numerous applications with common control requirements. External, high-speed, static, writable control store memory stores the microcommands accessed and executed by the controller. Unique microcommand sets (firmware) for specific applications tailor the controller hardware for the control function required.

Figure 8:
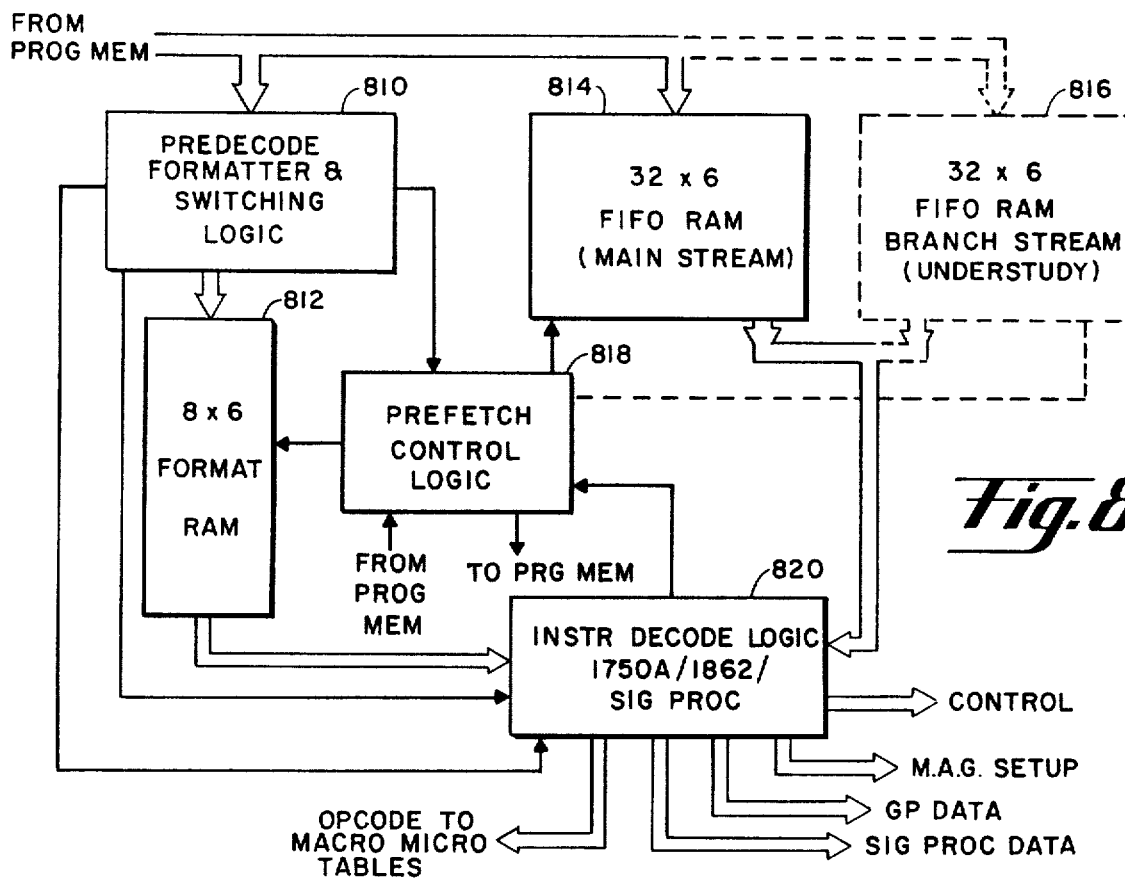
FIGS. 8 and 9 are block diagrams of a program controller VHSIC chip, and a general purpose controller custom chip, respectively.

One embodiment of a program controller is shown in FIG. 8. It comprises a precode formatter & switching logic unit 810, a FIFO random access memory unit 814 for a main stream, optionally a FIFO random acess memory unit 816 for a branch stream, all having inputs from the program memory. A format RAM 812 has data input from the unit 810, and control input from a prefetch control logic unit 818. An instruction decode logic and signal processor unit 820 has inputs from other units of the program controller, and data outputs to other parts of the system.

General Purpose Controller (GPC) Custom Chip

Figure 9:
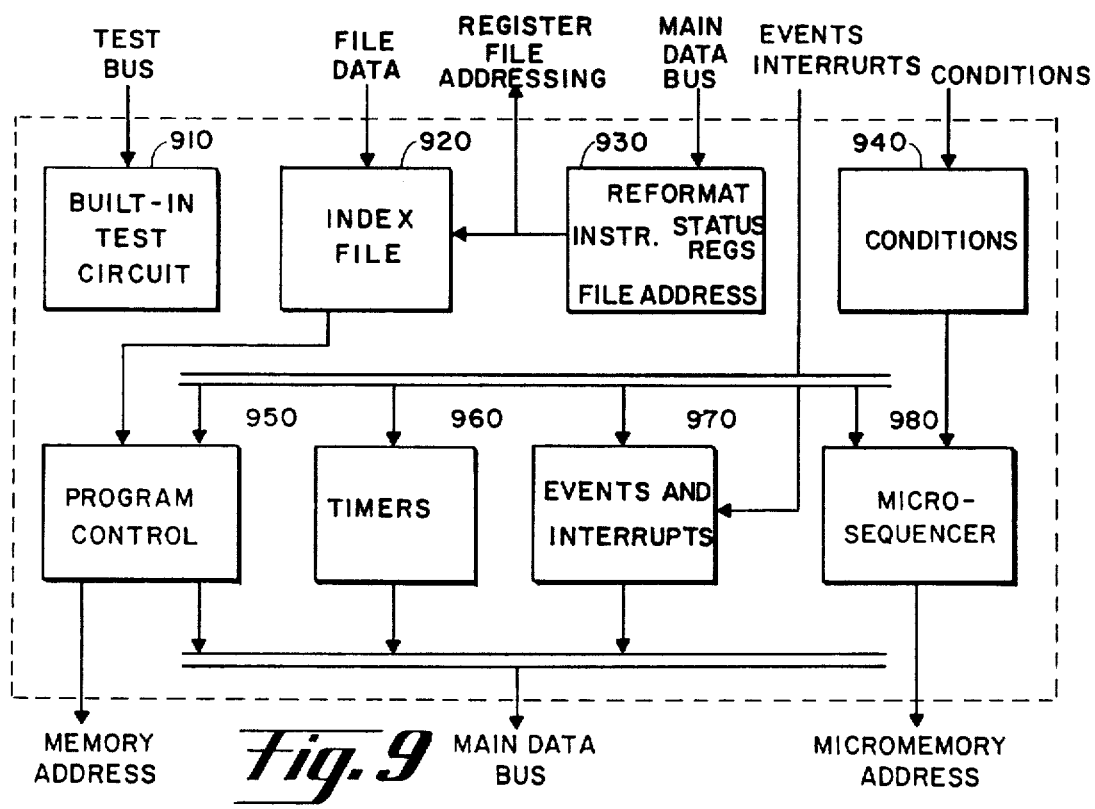

An embodiment of the GPC as used in said recent embodiment of the CAVP is shown in FIG. 9. It is designed for use as the microprogrammed control element in embedded 1750A and 1750A GP computers. The GPC is combined with the EAU and the microcode that controls these two chips, to form the CPU portion of a 1750A computer. The GPC can directly address 256K of memory and has instruction fetch overlap capability. This capability contributes to the three MIPS (DIAS mix) performance rate of the 1750A computers in which the GPC is used. The reformat section 930 of the chip performs the full MIL-STD-1750A instruction decode. This section also supports signal processing instruction sets via the 4F user defined opcode instruction. Some of the elements which make the GPC microsequencer 980 powerful are an eight-level return stack, four jump registers, a microprogram address register and a skip/hop adder. Other logic on the chip is provided to implement the 1750A status register and interrrupt and timer logic. These include an index file unit 920, a conditions unit 940, a program control unit 50, a timers unit 960, and an events and interrupts unit 970. A built-in-test 910 capability also resides on the chip and can be used at the wafer, component and module levels.

Extended Arithmetic Unit (EAU) Custom Chip

The Extended Arithmetic Unit (EAU) is an arithmetic computing device intended to combine with the General Purpose Controller and memories and gate arrays to form a microcomputer which executes the MIL-STD-1750A ISA. It performs 16-bit by 16-bit integer multiplies in two microcycles, 32-bit floating point adds/substracts in three clock cycles, including normalization/denormalization, and 16-bit integer adds/subtracts in one clock cycle. It intended to provide high-speed 16-bit, 32-bit and floating point operations to support general purpose computing and signal processing applications. It supports single-precision (16 bit), double-precision, and floating point (24-bit mantissa - 8-bit exponent) data formats. Support to MIL-STD 1750A 48-bit and to Westinghouse 64-bit extended precision floating point formats is provided. The EAU is designed to operate efficiently with a 25 MHz system clock in both general purpose computing and vector processing applications.

Figure 10:
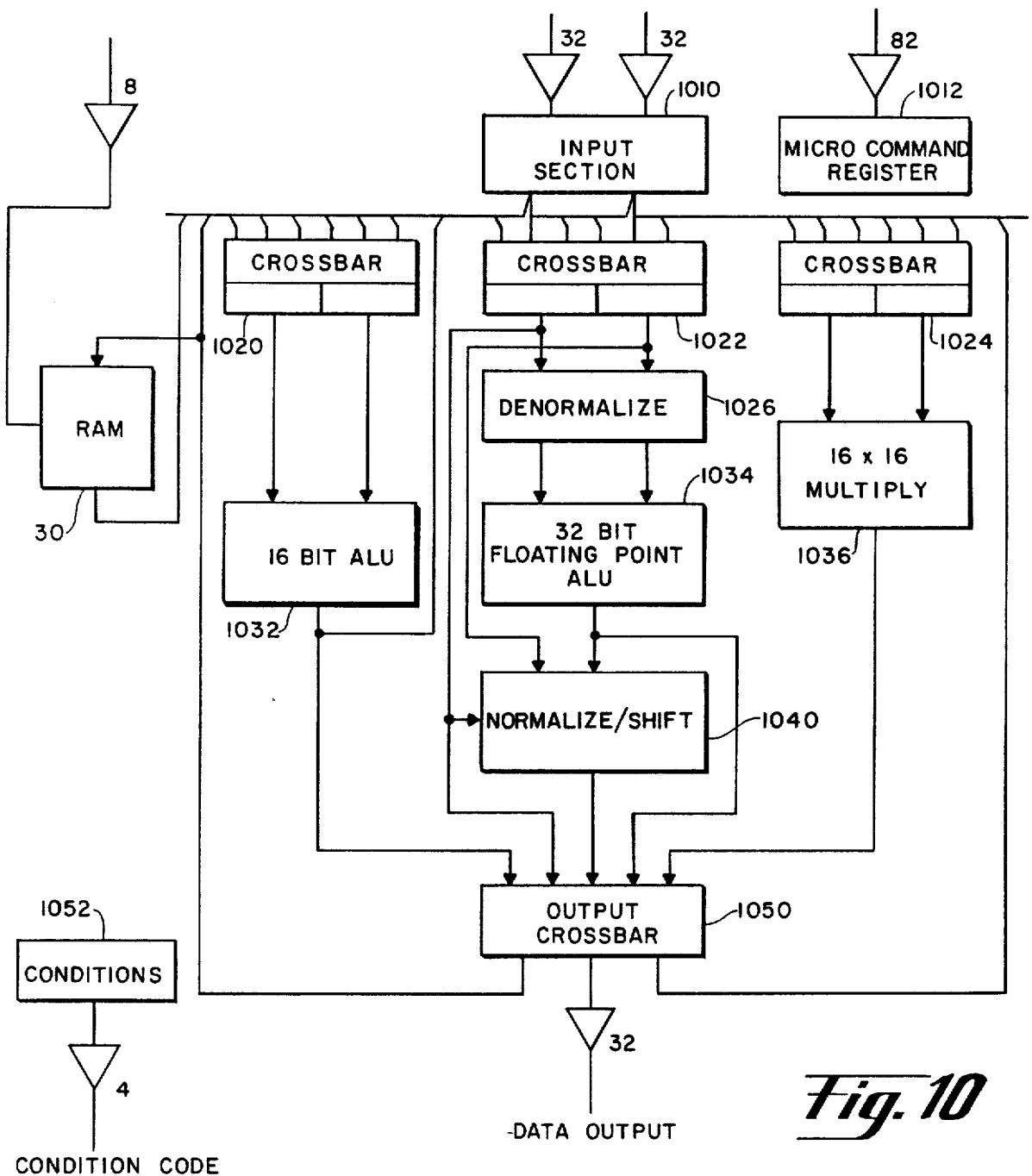
FIGS. 10 and 11 are block diagrams of different embodiments of an extended arithmetic unit VHSIC custom chip.

A first embodiment of the extended arithmetic unit (EAU) chip is shown in FIG. 10. It provides a design which permits it to be used efficiently in both data processing and general purpose computer applications. Its features are as follows:

1. Contains two ALU's 1032 and 1034: one 16-bit and one 32-bit, each with look-ahead carries. Each is capable of performing 23 basic functions concurrently with any control, selection or data move function within the chip.
2. Through the use of a function modifier, the instruction to the ALUs can be altered on the basis of selectable criteria which occur during the calculation process. This reduces significantly the amount of program branching required for most applications.

3. With the use of the two ALUs, extended precision computation within the chip is supported.
4. Capable of doing double-precision barrel shifting at a 25 MHz rate.
5. Built-in 16×16 twos complement multiplier 1036 capable of generating full-length products at a 25 MHz rate.
6. Status flip-flops (not shown) which indicate zero ALU result, resutl sign, overflow and carry out from either the 16-bit ALU 1032 or the 32-bit ALU 1034.
7. Ability to suspend operation without altering register contents.
8. A 16×16 register file for MIL-STD-1750A general purpose registers and an 8×32 file for 32-bit operation.

The EAU chip supplies a register 1012 for holding the microcode command bits as well as the necessary logic for decoding contents to control internal data paths and functions.

The EAU chip also contains logic to aid in the testing of the chip.

The 1750A Data Formats (described in MIL-STD-1750A (USAF), 2 July 1980, sections 4.1.5, 4.1.6, 4.1.7, 4.1.8) supported by the EAU are:
single precision fixed point
double-precision fixed point
floating point
extended precision floating point
Other formats supported are:
double-precision floating point (64 bits)
single-precision complex
double-precision complex
floating point complex Data paths and control lines are provided to allow micromemory routines to implement these formats.

Figure 11:
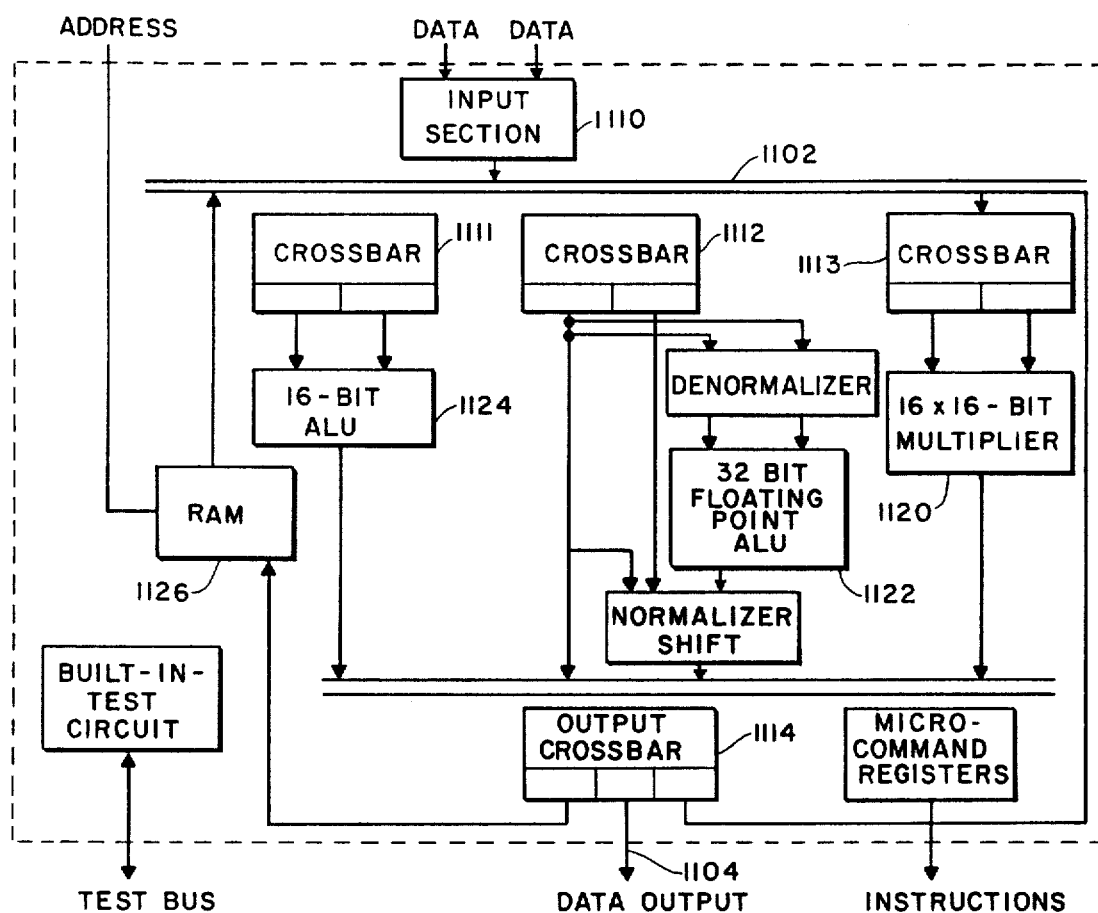

A more recent embodiment of the extended arithmetic unit (EAU) shown in FIG. 11 has the following major functional sections: input, output, multiplier, 32-bit floating point ALU, 16-bit fixed point, ALU, RAM, microcode command register, and built-in-test.

The input section 1110 provides two 32-bit external inputs, reformattted A and reformatted B. Reformatted A feeds crossbars 1111, 1112, and 1113; and reformated B feeds crossbars 1111, 1112, 1113 and 1114. Also available on crossbar 1113 are the lower 16 bits of chip input A, which bypasses the input section formatting logic. The output section is capable of accepting inputs from both ALUs and the multiplier. It contains two crossbars 1114 which are capable of loading data from various points. On one crossbar outputs a register feeds the chip output pins 1104. Another register feeds the input buses and a RAM for storing intermediate results. A second crossbar contains a register that will feed crossbars 1111 and 1113.

The multiply section 1120 contains the hardware to perform an isolated 16-bit integer multiply, in two microcycles, and pipelined operation at a rate of one every microcycle. It makes the full 32-bit product in four possible alignements to the output section.

The floating point 32-bit arithmetic/logic section 1122 contains the logic necessary to do a 32-bit floating point add or subtract in three clock cycles, including denormalizing and normalizing. It also contains logic for the shifts, integer, logical, and masking operations required to support arithmetic operations on 32-bit integer values directly, and on 48-bit extended floating point values when used in conjunction with off-chip microcode routines.

The fixed point 16-bit arithmetic/logic section 1124 contains the logic necessary to do a 16-bit integer add or subtract in one clock cycle. It also contains logic for the integer, logical, and masking operations required to support arithmetic operations on 16-bit integer values directly.

The RAM section 1126 is made up of a register stack containing thirty-two 16-bit words. The stack has two read ports and one write port. The write port optionally always writes consecutive locations, and one read port optionally reads consecutive locations.

Data formats supported by the EAU are single-precision fixed point, double-precision fixed point, floating point, extended precision floating point, double-precision floating point, single-precision complex, double-precision complex, and floating point complex.

GATE ARRAYS (GA)

Low cost VLSI circuits in the form of gate arrays will be used for interface and miscellaneous logic. The basic Westinghouse VHSIC gate array contains 7900 reconfigurable gates for logic functions plus a total of 120 dedicated drivers, receivers and tri-state driver/receiver buffers for I/O.

Personalization of the gate array involves the definition and generation of one or two interconnect masks. To aid in this process, the interconnects for frequency used SSI and MSI basic cells such as NAND gates, D flip-flops, etc., will be generated and stored in a library file. A verfied logic simulation will be provided to check out larger circuits built up from cells on file and uniquely created gate configurations. An automatic placement and routing program (iterated as necessary to maximize use of the gates and to minimize interconnect length) will complete the definition of the interconnection masks.

Clock Distribution Gate Arrays (CDGA)

Figure 12:
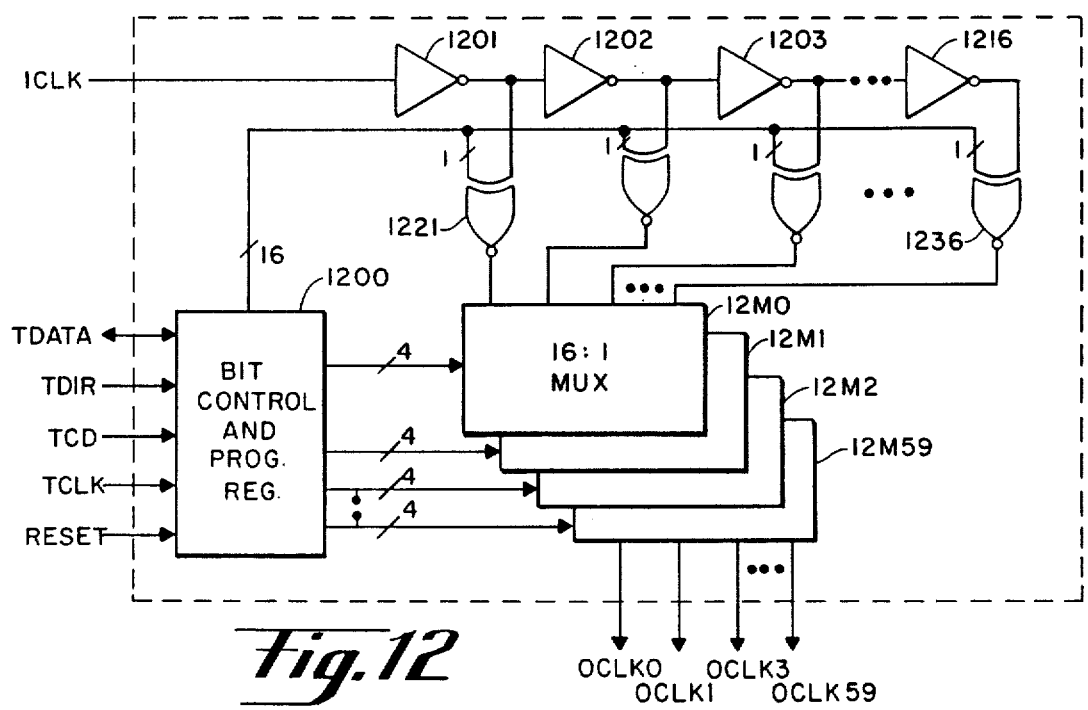
FIG. 12 is a block diagram of of a clock distribution gate array chip.

The CDGA shown in FIG. 12 is used for distribution and alignment of clock signals on a VHSIC module. The CDGA distributes a single input signal on lead ICLK to sixty different outputs on leads OCK-0-OCK59, which are the respective outputs of sixty 16:1 multiplex (MUX) units 12M0-12M59. Each of the outputs can be programmed to have a time delay with respect to each other. The delay can be from 0 to 15 nanoseconds in one-nanosecond increments. These delays are created by a chain consisting of sixteen inverters 1201-1216. The output of each inverter is connected to the input of a corresponding one of sixteen exclusive-OR gates 1221-1236. Each of the exclusive-OR gates has its output connected to inputs of all sixty of the MUXs 12M1-12M59. The amount of delay in each output signal is dependent on which input is selected on its corresponding MUX. The select lines to each MUX are controlled through test registers that can be loaded from a BIT controller circuit 1200. The exclusive-OR gates 1221-1236 are included on the inputs to each MUX in order that a particular path can be distinquished from all the others. A paritcular path can be distinquished by inverting all the others by using the exclusive-OR gates, thereby making this design easier to test. The control to the exclusive OR gates is also through a test register that can be loaded from the BIT controller circuit 1200.

Crossbar Gate Array (XBGA)

Figure 13:
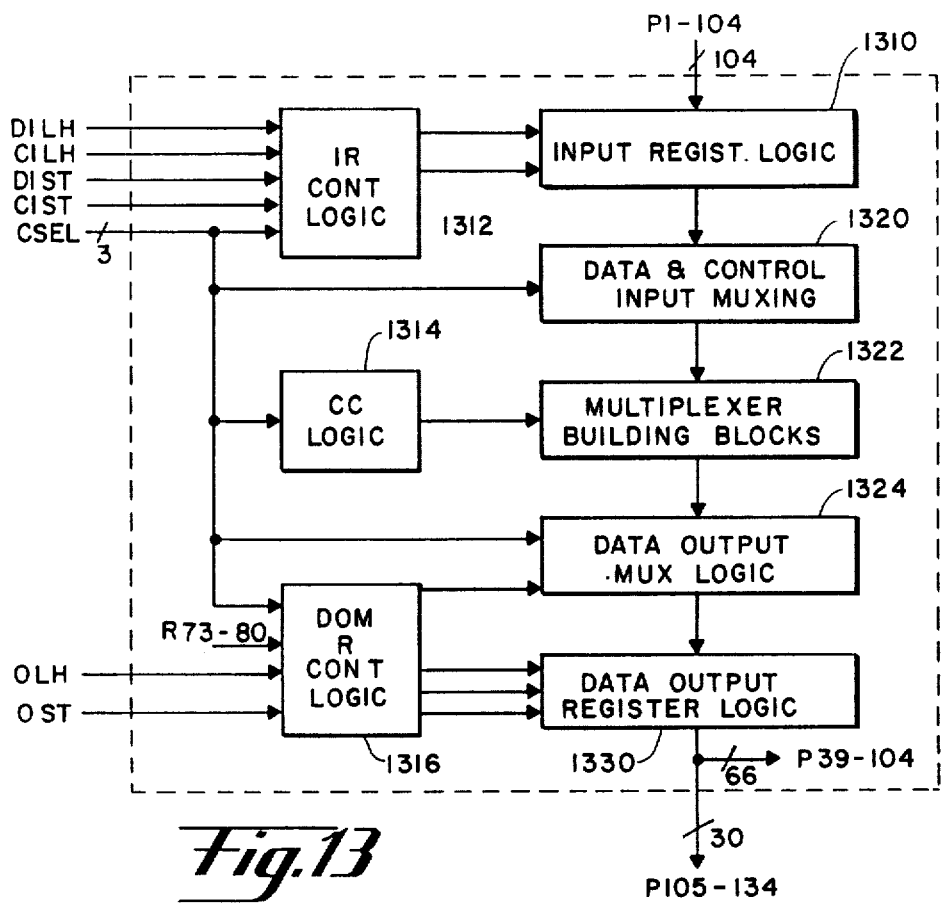
FIG. 13 is a block diagram of a crossbar gate array chip.

The XBGA shown in FIG. 13 is used for signal multiplexing. In general, a crossbar is a multiplexer that has more than one output. Each output on a crossbar can independently be assigned the value of any one of the crossbar inputs. The XBGA has eight different modes, with each mode being a different crossbar configuration. The crossbar configuration in each mode is given below:

| | | |
|---|---|---|
| C1) | Two submodes | |
| | C1A: eleven 11:1 × 4 bits | |
| | C1B: ten 11:1 × 4 bits | |
| C2 | five | 14:1 × 6 bits |
| C3 | eight | 8:1 × 6 bits |
| C4 | four | 6:1 × 12 bits |
| C5 | six | 8:1 × 8 bits |
| C6 | six | 2:1 × 16 bits |
| C7 | ten | 4:1 × 8 bits |
| C8 | two | 6:1 × 16 bits |

The nomenclature used in specifying the crossbar configurations above is explained below by using configuration C8) as an example.

two - specifies the number of outputs (2)
6:1 - specifies the number of inputs (6)
16 bits - specifies the bit width of all inputs and outputs Multiple XBGAs can be used together to achieve wider bit width words or a greater number of multiplexer outputs. The block diagram in FIG. 13 shows the XGBA to contain data input registers 1310, control input registers 1312, 1314 & 1316, and output registers 1330. The input registers 1310 and output registers 1330 are coupled via a data & control input multiplexing unit 1320, a multiplexer building blocks unit 1322, and a data output multiplexer logic unit 1324 in sequence.

The registers are effective in all eight modes. Each of the three register groups can be independently controlled in two ways:

(a) Load of hold
(b) By-pass with a 2:1 mux or not

Within a given configuration all address input registers have common control, as do al linput data registers except for configurations C2 and C1B. In C1B or C2, when OHOLD equals a value of '1', each data input register has independent load/hold control. The output registers have common control in all configurations except C3 or C1B. In these configurations, when OHOLD equals a value of '0', each data output register has independent load/hold control. The crossbar configuration is selected by the configuration control inputs which are designated as CONF01-04.

Vector Timing Gate Array (VTGA)

Figure 14:
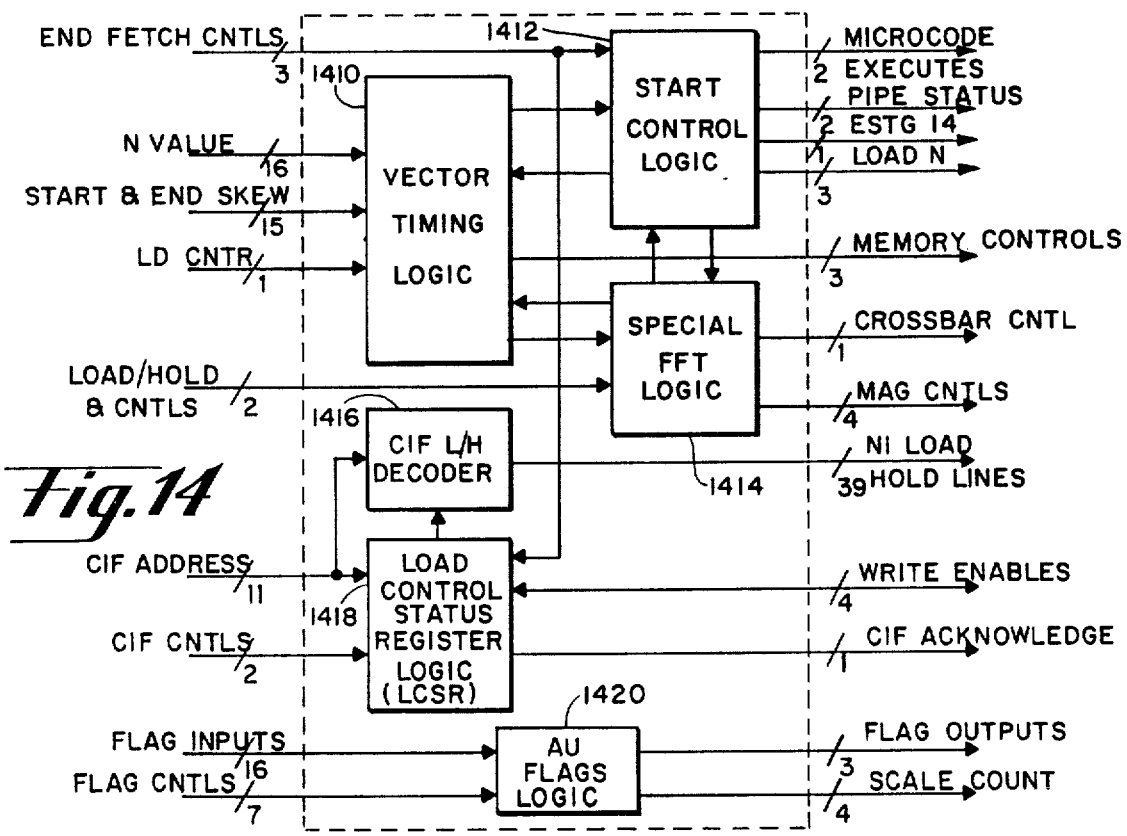
FIGS. 14 and 15 are a block diagrams of a vector timing gate array chips for mode 0 and mode 1 respectively.
Figure 15:
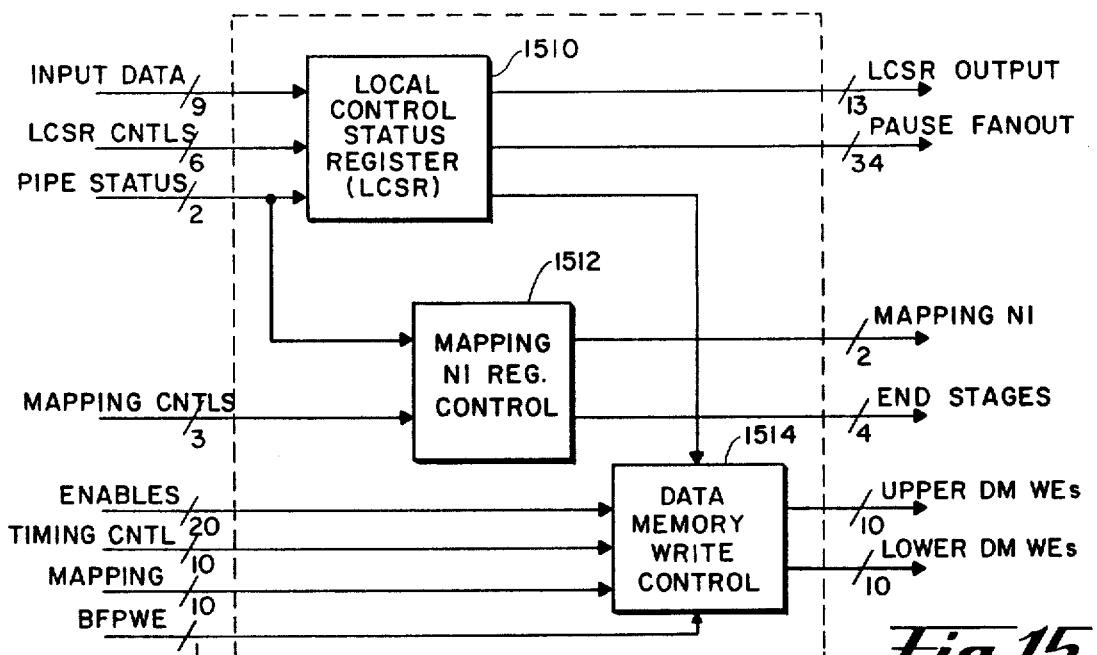

The purpose of the VTGA is to perform a variety of control functions required in the vector processing unit of the CAVP. A brief description of the major functional blocks of the VTGA shown in FIGS. 14 and 15 is given below:

Vector Timing Logic 1410 and Data Memory Write Control Logic 1514 - provides read and write control to memory address generators (MAGs) and data memories, based on the length of vectors being processed and the length of the pipeline in the vector processing unit.

Start Control Logic 1412 - provides an interface on status to the 1750A with regard to the activity in the VPU, in order that vector instruction set up can be overlapped with execution of the previous vector instruction.

Special FFT Logic 1414 - provides timing signals that control the MAGs and data memory crossbars in a way that is unique to the FFT instruction.

Logic Control Status Register 1510 - provides the control required to single step the VPU at several different rates.

AU Flags Logic 1420 - provides control logic that defines a window during which time the AU flags have a valid effect on the flag registers.

The block shown in FIG. 14 also includes a decoder unit 1416 and a load control status register logic unit 1418.

CAVP Control Gate Array (CCGA)

Figure 16:
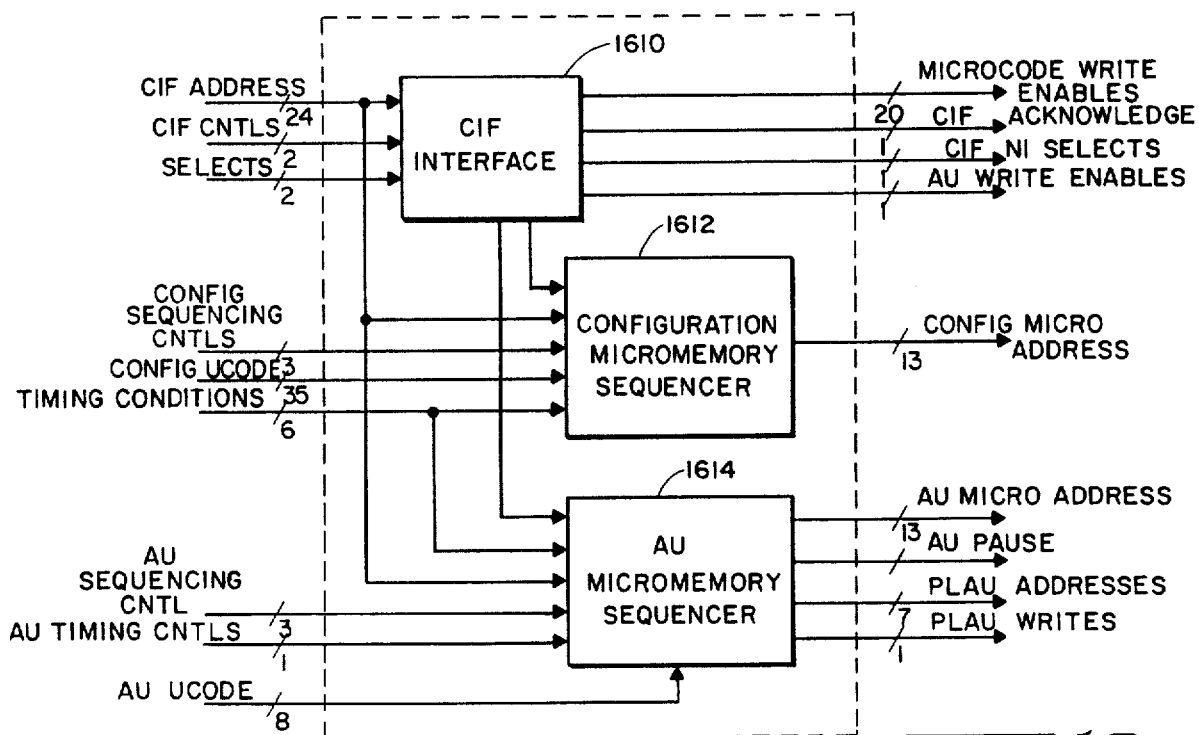
FIG. 16 is a block diagram of a CAVP control gate array chip.

The function of the CCGA shown in FIG. 16 is to provide address and write enable control to both the configuration and arithmetic micro memories in the CAVP at a 40 MHz rate. Address and write enables to the configuration micro memory are generated based on the CIF interface logic and the configuration micro memory sequencer logic.

The CIF interface logic 1610 allows the configuration micro memory to be written from the CIF for initial download of microcode. It also allows the configuration micro memory to be read from the CIF in order to verify what was written. The configuration micro memory sequency logic 1612 provides the sequencing types given below, in order that the configuration micro memory can provide the control required in the module.

Configuration Micro Sequencing Types:
1. Increment the address
2. Jump to a specified address
3. Loop on a segment of microcode
4. Loop on a segment of microcode and repeat within the loop.

The AU micro memory consists of two parts. One part is referred to as the bulk AU memory which contains all AU micro instructions. The other part is referred to as the PLAU micro memory which consists of four memory locations resident of each of the PLAU chips, which comprise the CAVP vector arithmetic unit. The PLAU micro memory is 192 bits wide and can be loaded 32 bits at a time. This feature alleviates chip pin constraints and allows half of the CAVP vector arithmetic unit to be implemented ona single VHSIC custom chip. Control of the AU micro memory consists of an interface to the CIF, control to load micro instructions from the bulk AU micro memory into the PLAU micromemories and the AU micro memory sequencing logic. The CIF interface logic permits the bulk AU memory to be written from the CIF for initial download of microcode to be read back for verification. In the operational mode, micro instructions must be loaded from the bulk AU micro into the PLAU micros prior to execution of a signal processing instruction. Control is provided to allow simultaneous signal processing instruction execution and loading of the PLAU micros in order to keep overhead to a minimum. Loading of the PLAU micro memories from the bulk AU micro memory is transparent to the user. The AU micro sequencing logic provides the sequencing types given below in order that the AU micro memory can provide the control required in the module.
1. Jump to a specified address.
2. Loop on a segment of microcode.

Memory Address Generator Gate Array (MGGA)

Figure 17:
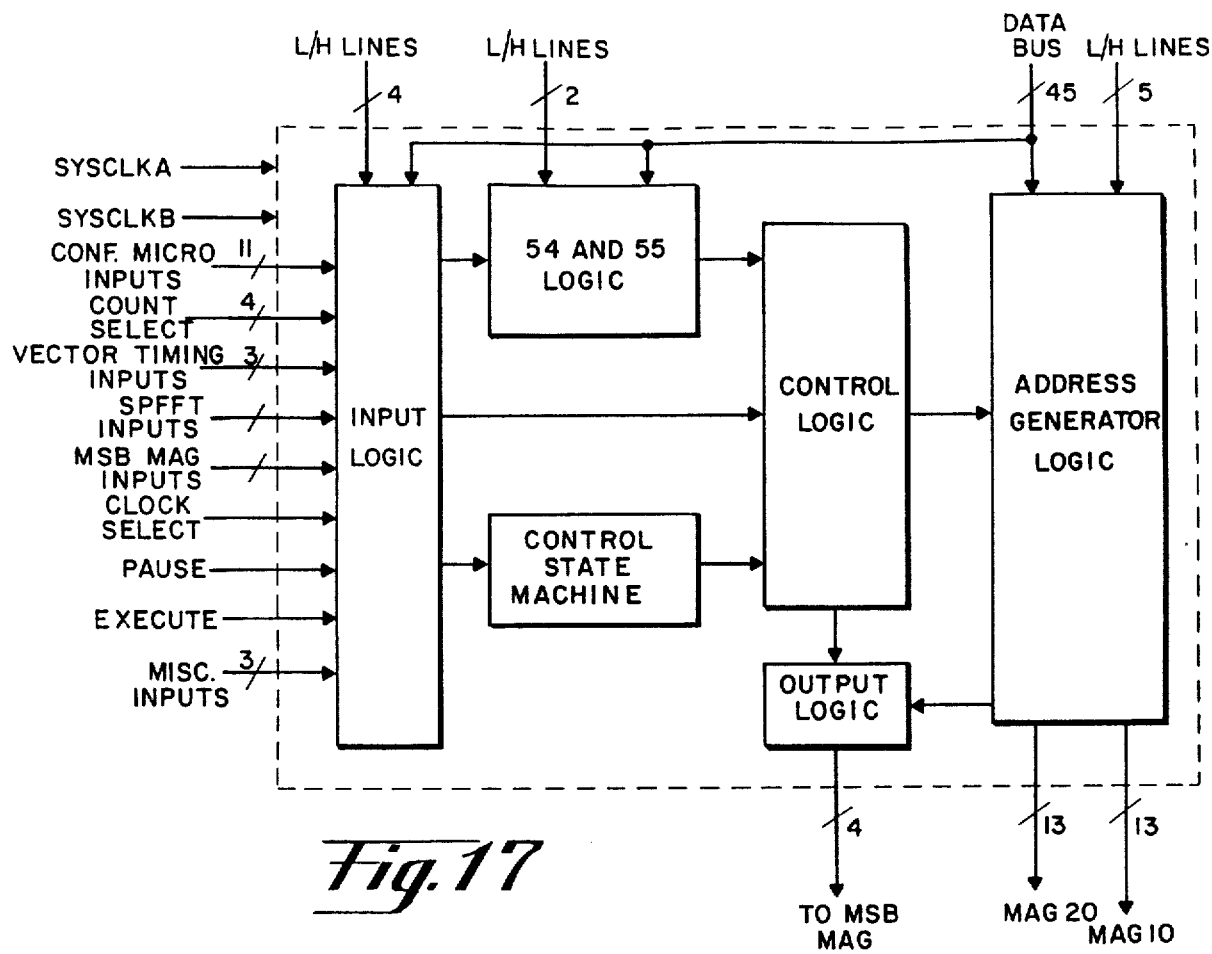
FIG. 17 is a block diagram of a memory address generator gate array chip.

The function of the MGGA shown in FIG. 17, once initialized, is to provide an automatic sequence of 13-bit addresses to a vector processor data memory. It comprises an input logic unit 1710, a "54 and 55 logic" unit 1712, a control state machine unit 1714, a control logic unit 1716, an output logic unit 1718, and an address generator logic unit 1720. The MGGA can generate the thirteen basic address sequence types listed below.

1. Straight
2. Increment
3. Bit Reverse
4. Bit Twist
5. ¼, ½ AU Bit Twist
6. FFT Constant
7. Segment
8. Type I Corner turn
9. Type II Corner turn
10. Fractional DAG
11. Integer DAG
12. Table Look Up
13. I/O Counter The MGGA can be used at a clock frequency of 25 MHz of 40 MHz. When used at the 40 MHz clock rate, it takes four clock times as opposed to two to obtain a valid address at the MGGA output, as it is more pipelined in this configuration.

Another feature of the MGGA is that for some of the sequence types given above, two MGGAs can operate in parallel in order to achieve a wider bit length output.

A brief description of each of the MGGA sequence types is given below:

1. Straight - An increment of one is added to the current address value on each successive clock. The offset value (initial value of the address) is specified in the signal processing instruction.
2. Increment - An increment value is added to the current address value on each successive clock. The offset value and the increment value are specified in the signal processing instruction.
3. Bit reverse - The least significant bit of a straight sequence is reversed with $K^{th}$ bit. The second least significant bit and the $(K-1)^{th}$ bit are reversed. All bits remaining between the second least significant bit and the $(K-1)^{th}$ bit are also reversed in a similar manner. The bit reverse number specifies the $K^{th}$ bit and is specified in the signal processing as is the offset value. The bit reverse sequency is used to order FFT results in frequency ascending order.
4. Bit Twist - The $K^{th}$ least significant bits of a straight sequence are inverted. The bit twist number which specifies K is specified in the signal processing instruction as is the offset value. The bit twist sequence is used in performing the FFT instruction.
5. ¼, ½ AU Bit Twist - Similar to bit twist. Required to perform the FFT in processors with a ¼ AU or a ½ AU architecture.
6. FFT Constant - An increment of one is added to the current address value at a rate that is dependent on what stage of the FFT is being performed. The current address will be incremented in such a way as to allow one FFT constant to be accessed during the first stage. The number of FFT constraints to be accessed is increased by a factor of two for each successive stage. The offset value is specified in the signal processing.
7. Segment - The segment sequence is used in association with a four segment memory where each memory segment can only be accessed at ¼ the system rate. The segment sequence stores the data in such a way that it can be accessed from each memory segment sequentially and thus achieves the maximum throughput equal to the system rate.
8. Type I Corner turn - The Type I cornerturn sequence is used to access data which has been stored using either the straight or segment sequence. The cornerturn is a composite of increment sequences with each increment sequence starting at an offset of one greater than the previous increment sequence offset.
9. Type II Corner turn - The Type II cornerturn sequence is also used to access data which has been stored using either the striaght or segment sequence. The Type II cornerturn is a composite of increment sequences with each increment sequence starting at an offset of one less than the previous increment sequence offset.
10. Fractional DAG - An increment value (0) is added to the current address value (0) on each successive clock. In addition, a second increment value (0) is added to the first increment value (0) on each successive clock. The initial value of 0, and value 0 are poited by SP instruction arguments. This sequence type is used to generate non-linear address sequences.
11. Integer DAG - One of the four possible increment values is added to current address value on each successive clock, based on prioritized conditions. The offset value and four increment vlaues are pointed to by SP instruction arguments. This sequence is used to generate address sequences which allow a matrix to be accessed in such a wa that interpolation operations are performed.
12. Table Look Up - MAG is used as an order. The data output of the AU is added to an offset. The resulting sequence is an address to one of the data memories. A form of indirect addressing.
13. I/O Counter - MAG is used as a counter with reset and hold control. Used in this mode to provide addresses for module input and output buffers.

1750A Memory Control Gate Array (MCGA)

Figure 18:
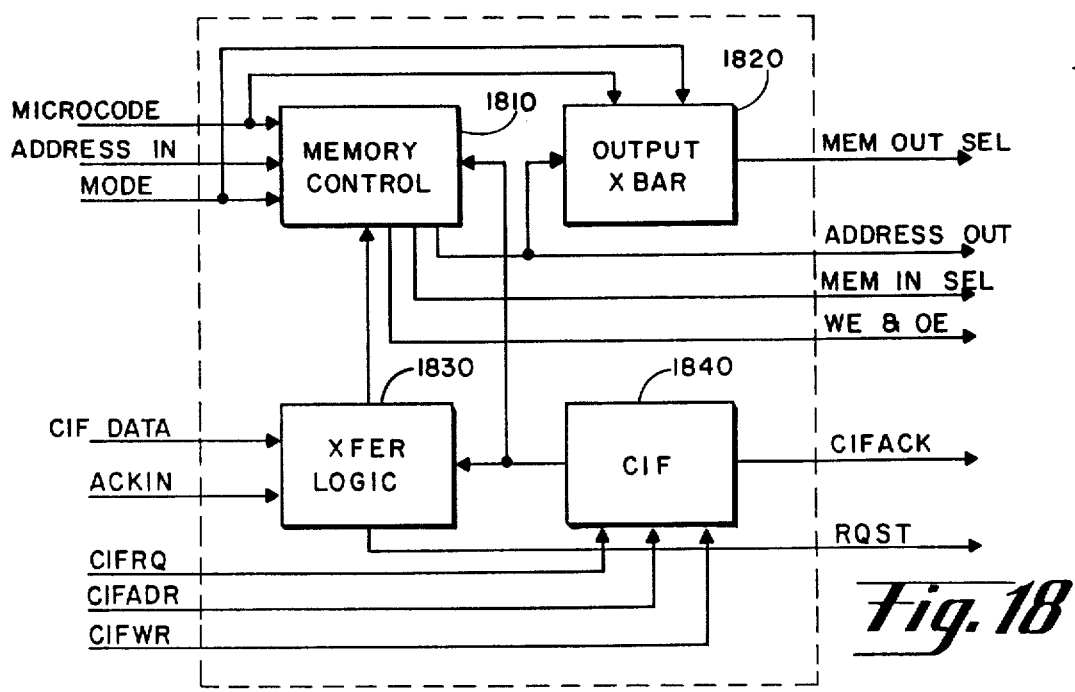
FIG. 18 is a block diagram of a memory control gate array chip.

The function of the CCGA shown in FIG. 18, comprising a memory control unit 1820, an output crossbar unit 1820, a transfer logic unit 1830 and an interface unit 1840, is to provide write enables and XBAR control to the 1750A program memory and its associated data and address crossbars. It also provides write enables and XBAR control to the control memory and its associated data and address crossbars. The 1750A program memory write enables and XBAR control are generated by the MCGA. The MCGA was designed to support the following 1750A program memory users in the CAVP module.

| 1750A Memory Users | Purpose |
|---|---|
| 1750A CPU | Access Instructions and Data |
| CIF | I/O with Control Bus |
| Control Memory | Block Data Transfer |

| 1750A Memory Users | Purpose |
|---|---|
| VPU Data Memory | Block Data Transfer |
| HSB | I/O of High Speed Bus |
|  | Header (Control) Information |

The CAVP 1750A program memory is organized as two 16K×32-bit memories, which each segment being 16-bit addressable by the 1750A CPU as shown below.

| 16K−2 | 16K−1 | 32K−2 | 32K−1 |
|---|---|---|---|
| . | . | . | . |
| . | . | . | . |
| . | . | . | . |
| 2 | 3 | 16K+2 | 16K+3 |
| 0 | 1 | 16K | 16K+1 |
| 16 bits | 16 bits | 16 bits | 16 bits |

The 32-bit memory allows signal processing instruction set-up to be accomplished twice as fast as it could be with only a 16-bit memory. The dual memory structure allows concurrent access of each segment by different users. The arbitration priority provided by the MCGA is that the 1750A CPU can always get access to program memory and the CIF can cycle steal from 1750A CPU. The 1750A CPU can set up a transfer between a program memory segment and the control memory, a VPU data memory, or the high-speed bus interface. Once the CPU has done this, it can continue operation out of the other segment. The CIF is locked out of program memory during one of these transfers.

CONCLUSION

The CAVP clearly represents an advancement in the state of the art of programmable signal processors. Significant advancements have been achieved in this design due to the skillful combination of VHSIC technology and unique architecture concepts. This new design is based on non-obvious improvements to the inherently powerful architecture of the VAP (Vector Arithmetic Processor) portion of the Westinghouse PSP-X+ system.

The intrinsic benefits resulting from the use of VHSIC technology are evident from the estimates in the chart given below.

| KEY FEATURES | VAP | CAVP |
|---|---|---|
| Speed | 10 MHz | 40 MHz |
| Size | 28 Boards | 8 Boards |
| Power | 2500 W | 74 W |

Also, the VHSIC 8K×8 bit static RAM memory chip provides the functional and speed characteristics required to implement the CAVP's 64K by 16 bit program memory and ten 8K by 32 bit data memories using only 56 chips.

In addition to utilizing the most advanced integrated circuit technology, the CAVP possesses a highly sophisticated instruction set and architecture. The CAVP is programmed using MIL-STD-181A (Ada) with access to signal processing instructions via Ada procedure calls.

The signal processing instruction set of the CAVP is unique as it was derived to satisfy the foreseeable needs of the signal processing user community. The user community's needs, in the areas of radar, communications, and image processing, have been determined through in house experience in application programming of the PSP-X+ and by surveying the instruction sets of existing military and commercial signal processors. The results of there efforts are reflected in the number of instructions in the CAVP relative to those in the VAP as shown below.

| INSTRUCTION TYPES | VAP | CAVP |
|---|---|---|
| FFP | 3 | 3 |
| Filter | 4 | 6 |
| Arithmetic | 50 | 66 |
| Logical | 5 | 12 |
| Control and Setup | 14 | //200 (performed in the embedded 1750A) |

The primary feature of the CAVP architecture is to allow concurrent operations to be performed. The three most significant operations that can be performed concurrently are:

(a) Control functions, scalar operations and vector instruction set-up in the embedded 1750A (b) input and output of vector data between the I/O buffers and the high speed buses.

and (c) vector signal processing instruction execution in the VPU This conurrence allows the vector processing element to be kept as fully utilized as possible, thereby achieving maximum benefit. In addition to this feature, the CAVP has many unique architectural features which contribute to its qualtiy and to its high throughput, in a more subtle way. For example, the embedded 1750A contains control memories and a 32 bit addressable program memory to allow a fast set-up time for signal processing instructions. Also, block data transfers between the 1750A program memory and VPU data memories can occur concurrently with processing. The VPU portion of the CAVP also has many performance enhancing features such as automatic scaling between stages of an FFT. Data scaling is performed only when necessary to prevent overflow, thereby providing resultant data with the most significance possible. Another example of how throughput is enhanced indirectly is by being able to configure each of the ten data memories to perform the function of an input buffer, output buffer of processor memory. This capability reduces the need for movement of data from memory to memory. Man signal processing algorithms can be performed simply in the VPU due to its extensive memory addressing capability. The VPU contains six memory address generators which are under independent program control and can perform up to ten count sequence types. Two of the ten sequence types are Differential Address Generator (DAG) type sequences. The DAG sequences are non-linear and are useful for interpolation and coordinate transformation operations.

As the complexity of integrated circuits increases, built-in-test considerations increase in importance. The CAVP has extensive testability and fault isolation capability due, in part, to the use of the Test Bus (TBUS). The TBUS is an internal bus that allows each chip assembled on a module to be tested individually. The CAVP also has internal hardware, which is controlled from the CBUS and is used to independently single step the 1750A and the VPU portions of the module, at a variety of programmable rates. This is useful during initial module test and for maintenance purposes.

The CAVP fully utilizes the intrinsic benefits resulting from VHSIC technology to achieve dramatic improvements in speed, size, power, and memory capacity. The sophication of the CAVP signal processing instruction set allows it to have application in radar, communications and image processing. The concurrency provided by the architecture allows the instruction set to be executed efficiently. Many subtle features of the architecture have been shown to be non obvious contributors to high throughput. Built-in-test has been given a high degree of consideration due to the complexity of the design. The clever combination of these characteristics make the CAVP unparalleled as a state of the art programmable signal processor.

It is understood that certain modifications to the invention as described may be made, as might occur to one with skill in the field of this invention, within the scope of the appended claims. Therefore, all embodiments contemplated hereunder which achieve the objects of the present invention have not been shown in complete detail. Other embodiments may be developed without departing from the spirit of the invention or from the scope of the appended claims.

What is claimed is:

1. A complex arithmetic vector processor module which is optimized for high speed processing of large vectors, using very high speed integrated circuit (VHSIC) chips, to implement a signal processor having the highest possible throughput per volume while maintaining flexibility, for use in a system having a computer bus and a data bus, said module comprising:

a computer unit operating at a first clock rate and a vector processing unit operating at a second clock rate, the second clock rate being at a substantially higher frequency than the first clock rate, the vector processing unit being comprised of a vector processing control portion and a vector processing element portion;

wherein the computer unit comprises interconnected integrated circuit chip components including a controller, an arithmetic unit, a micro-memory, a program memory, a memory control circuit, and first switching means for selectively interconnecting said components of the computer unit and also for making selective connections to the vector processing unit;

wherein the vector processing unit comprises interconnected integrated circuit chip components including second switching means for selectively interconnecting said components; the vector processing element portion components being a data memory coupled to memory control circuits and a pipelined arithmetic unit; the vector processor control portion components being a vector micro memory, vector control circuits, vector timing circuits, and a memory address generator;

said module being integrated in said system via computer bus interface means for coupling said computer bus to the computer unit and to the vector processing unit, and data bus interface means for coupling said data bus via said second switch means to said vector processing element portion;

the computer unit being programmed for performing control function scalar operations and set-up of vector signal processing instructions to be performed by the vector processing unit;

the vector processing unit being programmed for performing high speed processing of real and complex vectors, wherein the vector processing control portion provides an interface and status to the computer unit, and also provides control necessary for vector processing to occur concurrently with execution in said computer unit and concurrent with input/output of vector data;

wherein said pipelined arithmetic unit comprises two pipelined arithmetic integrated circuit chips, each of which is a general purpose, programmable unit, for operation at said second clock rate, for use in advanced signal processors to perform high speed vector-efficient operations, supporting real and complex operations in addition to logical functions, and for use in pairs to perform high speed complex processing applications, and which can also be organized in a variety of pipelined configurations geared for specific signal processing applications;

wherein each of said pipelined arithmetic integrated circuit chips comprises two pipelined multipliers and four arithmetic logic units connected with each other and with input/output buses through multiplexers and registers via crossbar means in said second switch means, with micro-programming means for controlling the crossbar means to make the unit highly reconfigurable, means for equalizing delays insequential pipeline sections, including pipelining the multipliers and placing registers both ahead and after each arithmetic logic unit, which optimizes the speed in vector computations without the need for resorting to multiple clocks; means for bypassing the multipliers if they are not needed and to bypass one arithmetic logic unit if only one is needed, means for loading microcode for the next instruction concurrent with exection of the present instruction.

2. A complex arithmetic vector processor module according to claim 1, wherein each of said pipelined arithmetic integrated circuit chips includes function modification means, which is the changing of the arithmetic logic unit function or crossbar select code as a function of the processed data, thereby omitting frequent micro program jumps to making multiple passes on a vector under reconfigured arithmetic unit states, whereby the chip has controlled flexibility which allows the chip to be used for implementing a very wide range of data processing algorithms, which includes both real and complex functions, and whereby it can be used to perform in both single and double precision modes;

some functions that the pipelined arithmetic unit can perform being fact Fourier transform, recursive filtering, transversal filtering, matched filtering, convolutional filtering, spectrum, shifting, weighting and band limited interpolation, each of these being performed under micro-program control.

3. A complex arithmetic vector processor module according to claim 2, wherein said memory address generator is a gate array with means to initialize it, and which once initialized, comprises means including storage of a current address value to provide an automatic sequence of bit addresses to said data memory of the vector processing element, with sequence types including straight, increment, bit reverse, bit twist, $\frac{1}{4}$, $\frac{1}{2}$ arithmetic unit bit twist, FFT Constant, segment, first and second type corner turns, fractional DAG, integer DAG, table look up, and I/O Counter, said sequence types being operative as follows:

(a) straight - an increment of one is added to the current address value on each successive clock cycle, with an offset value (initial value of the address) specified in the signal processing instruction;

(b) increment - an increment value is added to the current address value on each successive clock, an offset value and the increment value being specified in the signal processing instruction;

(c) bit reverse - the least significant bit of a straight sequence is reversed with $K^{th}$ bit, the second least significant bit and the $(K-1)^{th}$ bit are reversed, all bits remaining between the second least significant bit and the $(K-1)^{th}$ bit are also reversed in a similar manner, the bit reverse number specifies the $K^{th}$ bit and is specified in the signal processing as is the offset value, the bit referxe sequence being used to order FFT results in frequency ascending order;

(d) bit twist - the $K^{th}$ least significant bits of a straight sequence are inverted, the bit twist number which specifies K is specified in the signal processing instruction as is the offset value, the bit twist sequence being used in performing the FFT instruction;

(e) $\frac{1}{4}$, $\frac{1}{2}$ arithmetic unit bit twist - similar to bit twist, required to perform the FFT in processors with a $\frac{1}{4}$ AU or a $\frac{1}{2}$ arithmetic unit architecture;

(f) FFT constant - an increment of one is added to the current address value at a rate that is dependent on what stage of the FFT is being performed, the current address will be incremented in such a way as to allow one FFT constant to be accessed during the first stage, the number of FFT constraints to be accessed is increased by a factor of two for each successive stage, the offset value being specified in the signal processing;

(g) segment - the segment sequence is used in associated with a four segment memory where each memory segment can only be accessed at $\frac{1}{4}$ the system rate, the segment sequence stores the data in such a way that it can be accessed from each memory segment sequentially and thus achieves the maximum throughput equal to the system rate;

(h) first type cornerturn - used to access data which has been stored using either the straight or segment sequence, the cornerturn being a composite of increment sequences with each increment sequence starting at an offset of one greater than the previous increment sequence offset;

(i) second type cornerturn - used to access data which has been stored using either the striaght or segment sequence, being a composite of increment sequences with each increment sequence starting at an offset of one less than the previous increment sequence offset;

(j) fractional DAG - an increment value (0) is added to the current address value (0) on each successive clock, in addition, a second increment value (0) is added to the first increment value (0) on each successive clock, the initial value of 0, and value 0 are pointed by SP instruction arguments, this sequence type being used to generate non-linear address sequence;

(k) integer DAG - one of the four possible increment values is added to current address value on each successive clock, based on prioritized conditions, the offset value and four increment values are pointed to by SP instruction arguments, this sequence being used to generate address seqeunces which allow a matrix to be accessed in such a way that interpolation operations are performed;

(l) table look up - memory address generator is used as an order, the data output of the arithmetic unit is added to an offset, the resulting sequence being an address to one of the data memories, a form of indirect addressing;

(m) I/O counter - memory address generator is used as a counter with reset and hold control, used in this mode to provide addresses for module input and output buffers:

the memory address generator gate array being capable to be used at said first or second clock rate;

and wherein for some of the sequence types, two memory address generator gate arrays can operate in parallel in order to achieve a wider bit length output.

4. A complex arithmetic vector processor module according to claim 3, wherein said vector timing circuits comprise a gate array for performing a variety of control functions required in the vector processing unit, including vector timing logic means and data memory write control logic means for providing read and write control to memory address generators and data memories, based on lengths of vectors being processed and the length of the pipeline in the vector processing unit;

start control logic means for providing an interface on status to said computer unit with regard to the activity in the vector processing unit, in order that vector instruction set up can be overlapped with execution of the previous vector instruction;

special FFT logic means for providing timing signals that control the memory address generator and data memory crossbars in a way that is unique to the FFT instruction.

logic control status register means for providing the control required to single step the vector processing unit at several different rates; and arithmetic unit flags logic means for providing control logic that defines a window during which time the AU flags have a valid effect on the flag registers.

5. A comples arithmetic vector processor module according to claim 4, wherein said vector micro memory comprises a configuration micro memory and an arithmetic unit micro memory, wherein said vector control circuits comprise a gate array for providing address and write enable control to both the configuration micromemory and the arithmetic unit micro memory at said second clock rate, wherein address and write enables to the configuration micro memory are generated based on the computer bus interface means and configuration micro memory sequencer logic;

wherein computer bus interface logic means allows the configuration micro memory to be written from the computer bus interface for initial download of microcode, and also allows the configuration micro memory to be read from the computer bus interface in order to verify what was written; and the configuration micro memory sequencer logic means provides the sequencing types given below, in order that the configuration micro memory can provide the control required in the module;

configuration micro sequencing types;

(a) increment the address,
(b) jump to a specified address,
(c) loop on a segment of microcode,
(d) loop on a segment of microcode and repeat within the loop.

6. A complex arithmetic vector processor module according to claim 5, wherein the arithmetic unit micro memory consists of two parts, one part being a bulk arithmetic unit memory which contains all arithmetic unit micro instructions, and the other part being a pipelined arithmetic unit micro memory which comprises four memory locations resident of each of the pipelined arithmetic unit chips, which comprise the complex arithmetic vector processor vector arithmetic unit;

the pipelined arithmetic unit micro memory being 192 bits wide and being capable of being loaded 32 bits at a time, whereby this feature alleviates chip pin constraints and allows half of the complex arithmetic vector processor vector arithmetic unit to be implemented on a single VHSIC custom chip;

wherein control of the arithmetic unit micro memory comprises an interface to the computer interface means, to control loading micro instructions from the bulk arithmetic unit micro memory into the pipelined arithmetic unit micromemories and the arithmetic unit micro memory sequencing logic, wherein the computer interface logic means permits the bulk arithmetic unit memory to be written from the computer interface means for initial download of microcode to be read back for verification, wherein in an operational mode, micro insturctions must be loaded from the bulk arithmetic unit micro into the pipelined arithmetic unit micros prior to execution of a signal processing instruction, and wherein control is provided to allow simultaneous signal processing instruction execution and loading of the pipelined arithmetic unit micros in order to keep overhead to a minimum, wherein loading of the pipelined arithmetic unit micro memories from the bulk arithmetic unit micro memory is transparent to the user, wherein the arithmetic unit micro sequencing logic provides the sequencing types given below in order that the arithmetic unit micro memory can provide the control required in the module:

(a) jump to a specified address,
(b) loop on a segment of microcode.

* * * * *

UNITED STATES PATENT AND TRADEMARK OFFICE
CERTIFICATE OF CORRECTION

PATENT NO. : 4,760,525

DATED : July 26, 1988

INVENTOR(S) : Richard F. Webb

It is certified that error appears in the above-identified patent and that said Letters Patent is hereby corrected as shown below:

```
Col 1, line 26, "PAt." should be -- Pat. --.
Col 1, line 50, "for" should be -- of --.
Col 5, line 35, "contorl" should be -- control --.
Col 6, line 48, "relates" should be -- related --.
Col 6, line 62, "vecotr" should be -- vector --.
Col 7, line 16, "twentyy-two" should be -- twenty-two --.
Col 9, line 51, "omre" should be -- more --.
Col 10, line 17, "160" should be -- 16 --.
Col 14, line 14, "Ω" should be -- ∩ --.
Col 14, line 18, "2" should be -- 2^ --.
Col 16, line 20, "POLE 1" should be opposite "One pole
  filter".
Col. 14, line 25, "2" should be --2∧ ÷ 15--
```

UNITED STATES PATENT AND TRADEMARK OFFICE
CERTIFICATE OF CORRECTION

PATENT NO. : 4,760,525  
DATED : July 26, 1988  
INVENTOR(S) : Richard F. Webb

Page 2 of 3

It is certified that error appears in the above-identified patent and that said Letters Patent is hereby corrected as shown below:

```
pose, programmable, 40-MHz chip designed for use   ---.
Col 19, line 16, "buttergly" should be -- butterfly --.
Col 19, line 33, "wo" should be -- two --.

Col 20, line 7,  "singe" should be -- single --.
Col 21, line 42, the period should be a comma.
Col 22, line 29, "interrrupt" should be -- interrupt --.
Col 23, line 12, "resutl" should be -- result --.
Col 23, line 63, "alignements" should be -- alignments --.
Col 25, line 40, "multiplexer" should be -- multiplex --.
Col 26, line 32, "sequency" should be -- sequencer --.
Col 26, line 51, "ona" should be -- on a --.
Col 27, line 53, "sequency" should be -- sequence --.
Col 28, line 31, "poited" should be -- pointed --.
Col 28, line 37, "vlaues" should be -- values --.
Col. 19, line 41, "registres" should be --registers-- (both
occurence).
```

UNITED STATES PATENT AND TRADEMARK OFFICE
CERTIFICATE OF CORRECTION

PATENT NO. : 4,760,525   Page 3 of 3
DATED : July 26, 1988
INVENTOR(S) : Richard F. Webb It is certified that error appears in the above-identified patent and that said Letters Patent is hereby corrected as shown below:

```
Col 28, line 40, "wa" should be -- way --.
Col 30, line 5, "there" should be -- these --.
Col 30, line 50, "Man" should be -- Many --.
Col 31, line 6, "sophication" should be -- sophistication --.
Col 32, line 28, a space should follow "in".
Col 32, line 53, "fact" should be -- fast --.
Col 33, line 18, "referxe" should be -- reverse --.
Col 33, lines 38-39, "associated" should be --association--.
Col 33, line 64, "sequence" should be -- sequences --.
Col 34, line 2, "seqeunces" should be -- sequences --.
Col 34, line 47, "comples" should be -- complex --.
Col 36, line 8, "insturctions" should be -- instructions --.
```

Signed and Sealed this

Twenty-third Day of June, 1992

Attest:

DOUGLAS B. COMER

*Attesting Officer*   Acting Commissioner of Patents and Trademarks